United States Patent
Arakane

(10) Patent No.: US 11,279,157 B2
(45) Date of Patent: Mar. 22, 2022

(54) IMAGE RECORDING APPARATUS

(71) Applicant: BROTHER KOGYO KABUSHIKI KAISHA, Nagoya (JP)

(72) Inventor: Satoru Arakane, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/028,350

(22) Filed: Sep. 22, 2020

(65) Prior Publication Data

US 2021/0001650 A1 Jan. 7, 2021

Related U.S. Application Data

(63) Continuation of application No. PCT/JP2019/009018, filed on Mar. 7, 2019.

(30) Foreign Application Priority Data

Mar. 26, 2018 (JP) .............................. JP2018-058214

(51) Int. Cl.
*B41J 25/00* (2006.01)
*B41J 13/00* (2006.01)

(52) U.S. Cl.
CPC .......... *B41J 25/006* (2013.01); *B41J 13/0009* (2013.01)

(58) Field of Classification Search
CPC .... B41J 25/006; B41J 13/0009; B41J 2/2132; B41J 19/142; B41J 13/0027; B41J 2/01; G06K 15/107
See application file for complete search history.

(56) References Cited

U.S. PATENT DOCUMENTS

| | | | |
|---|---|---|---|
| 5,847,721 A | 12/1998 | Ogata et al. | |
| 2003/0063153 A1* | 4/2003 | Bauer | G06K 15/107 347/40 |

(Continued)

FOREIGN PATENT DOCUMENTS

| | | |
|---|---|---|
| JP | H08-238762 A | 9/1996 |
| JP | 2009-262342 A | 11/2009 |

(Continued)

OTHER PUBLICATIONS

International Search Report dated May 21, 2019 received in International Application No. PCT/JP2019/009018 together with an English language translation.

(Continued)

*Primary Examiner* — Lamson D Nguyen
(74) *Attorney, Agent, or Firm* — Scully, Scott, Murphy & Presser, PC

(57) ABSTRACT

There is provided an image recording apparatus including: a conveyor; a carriage; a recording head; and a controller. In a case that a moving direction in the scanning direction of the carriage in one of the two continuous recording passes is same as a moving direction in the scanning direction of the carriage in the other of the two continuous recording passes, the controller is configured to make a length in the conveyance direction of the overlap area to be a first length. In a case that the moving direction in the scanning direction of the carriage in the one of the two continuous recording passes is different from the moving direction in the scanning direction of the carriage in the other of the two continuous recording passes, the controller is configured to make the length in the conveyance direction of the overlap area to be a second length.

10 Claims, 22 Drawing Sheets

(56) References Cited

U.S. PATENT DOCUMENTS

| | | |
|---|---|---|
| 2005/0195232 A1 | 9/2005 | Wu |
| 2009/0262375 A1 | 10/2009 | Yuda et al. |
| 2010/0013878 A1* | 1/2010 | Spaulding .............. B41J 19/142 347/9 |
| 2018/0009225 A1 | 1/2018 | Ohara |

FOREIGN PATENT DOCUMENTS

| | | |
|---|---|---|
| JP | 2009-279817 A | 12/2009 |
| JP | 2011-056869 A | 3/2011 |
| JP | 2016-159530 A | 9/2016 |

OTHER PUBLICATIONS

Written Opinion dated dated May 21, 2019 received in International Application No. PCT/JP2019/009018 together with an English language translation.

* cited by examiner

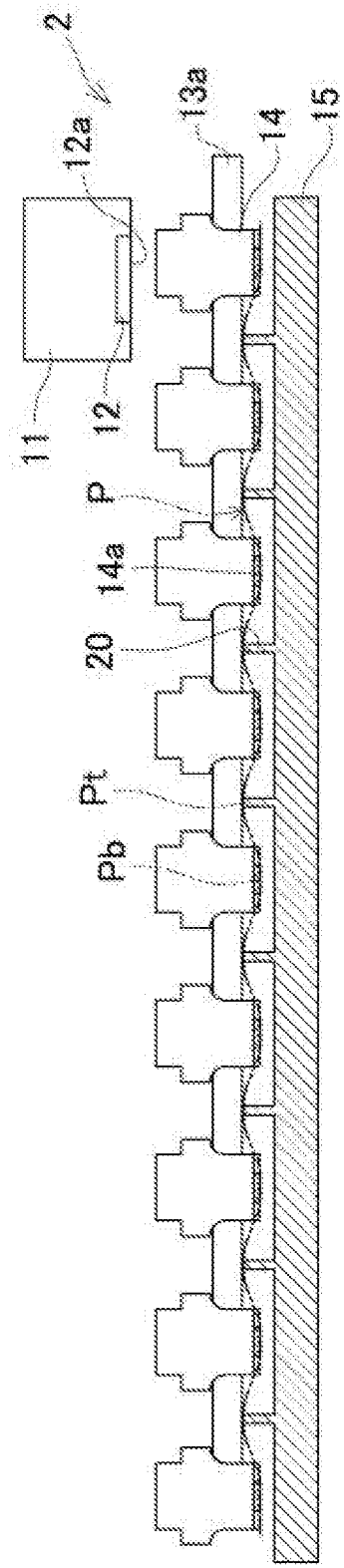
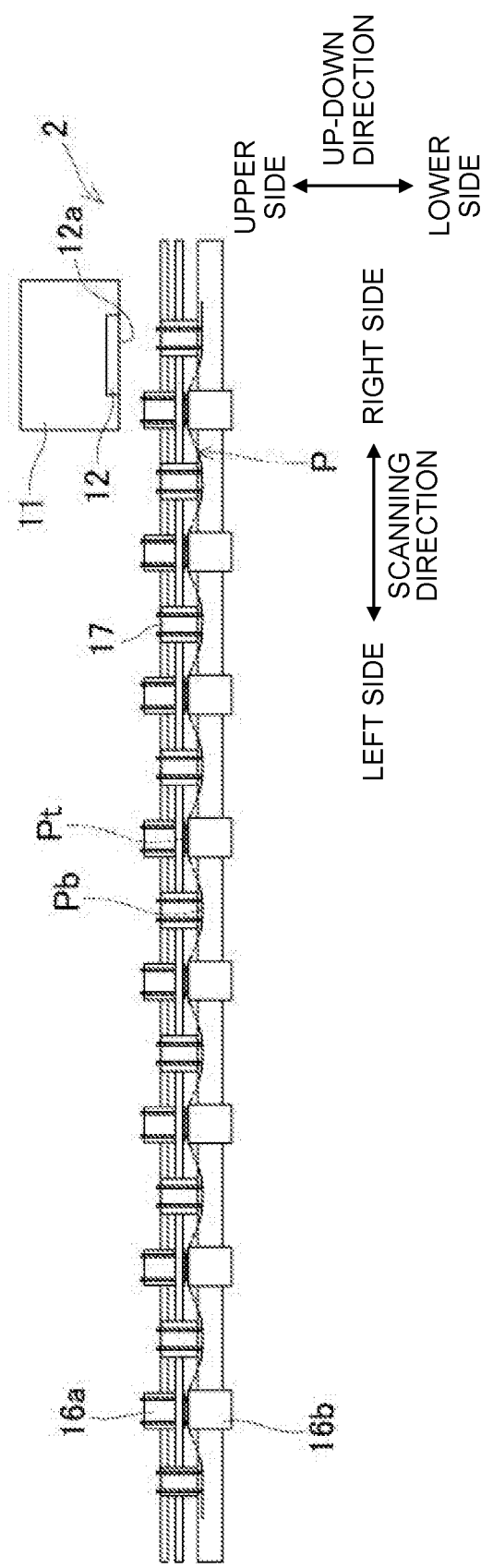

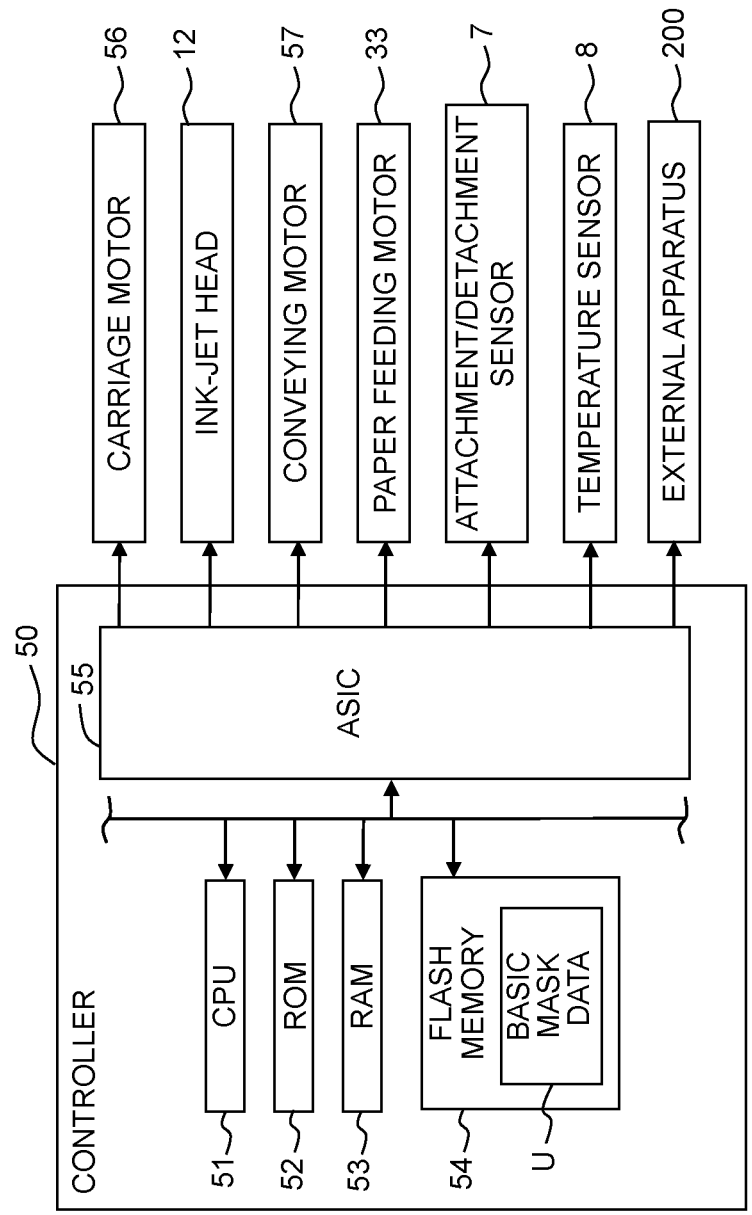

UNIDIRECTIONAL RECORDING MODE

BIDIRECTIONAL RECORDING MODE (AMOUNT OF DEVIATION OF LANDING IN SCANNING DIRECTION IS SMALL)

BIDIRECTIONAL RECORDING MODE (AMOUNT OF DEVIATION OF LANDING IN SCANNING DIRECTION IS LARGE)

MASK DATA IN A CASE THAT CONVEYANCE LENGTH OF OVERLAP AREA IS LENGTH E1

MASK DATA IN A CASE THAT CONVEYANCE LENGTH OF OVERLAP AREA IS LENGTH E2

MASK DATA IN A CASE THAT CONVEYANCE LENGTH OF OVERLAP AREA IS LENGTH E3

CASE THAT DEVIATION IN LANDING DOES NOT OCCUR
IN BIDIRECTIONAL RECORDING

CASE THAT DEVIATION IN LANDING OCCURS
IN BIDIRECTIONAL RECORDING

IMAGE RECORDING APPARATUS

CROSS REFERENCE TO RELATED APPLICATION

The present application is a continuation of International Application No. PCT/JP2019/009018 filed on Mar. 7, 2019 which claims priority from Japanese Patent Application No. 2018-058214 filed on Mar. 26, 2018. The disclosures of International Application No. PCT/JP2019/009018 and Japanese patent Application No. 2018-058214 are incorporated herein by reference in their entirety.

TECHNICAL FIELD

The present disclosure relates to an image recording apparatus.

BACKGROUND ART

As an example of an image recording apparatus which records an image, there is known an ink-jet recording apparatus which records an image by discharging (ejecting) an ink from a plurality of nozzles onto a recording medium. In the ink-jet recording apparatus, recording is performed on a recording sheet (an example of the recording medium) by alternately repeating recording of an image of one scanning and conveyance of the recording sheet in a sub scanning direction (hereinafter referred to as a "conveyance direction"). In a case of recording the image of one scanning, the ink-jet recording apparatus discharges the ink from the plurality of nozzles while moving a carriage having a recording head mounted thereon in a main scanning direction (hereinafter referred to as a "scanning direction").

Further, in the known ink-jet recording apparatus, the recording sheet is conveyed so that end parts in the conveyance direction of images each of which is recorded for one scanning overlap each other, and that central parts in the conveyance direction of the images do not overlap each other. Namely, the recording sheet is conveyed so that the images each of which is recorded in every one scanning partially overlap each other. In an overlap part at which the images are overlapped with each other, the images are recorded in a so-called multi-scan system in which the images are recorded while complimenting each other, by using different nozzles in each of a plurality times of scanning. In the recording apparatus described above, by recording the image partially in the multi-scan system as described above, the time required for recording the image is shortened while suppressing any occurrence of a black streak, etc., in the scanning direction on the recording sheet.

SUMMARY

Some image-recording apparatuses are configured to be capable of executing unidirectional recording and bidirectional recording. In the unidirectional recording, a moving direction (moving orientation) in the scanning direction of the carriage in one of two continuous scans and the moving direction in the scanning direction of the carriage in the other of the two continuous scans are the same. In contrast, in the bidirectional recording, the moving direction in the scanning direction of the carriage in one of the two continuous scans is different from the moving direction in the scanning direction of the carriage in the other of the two continuous scans. In the bidirectional recording, since the recording of the image is performed regardless of the moving direction in the scanning direction of the carriage, the bidirectional recording is capable of improving the throughput as compared with the unidirectional recording. On the other hand, in the bidirectional recording, any deterioration in the quality of the image might occur, in some case, due to the reason to be described later on.

An object of the present disclosure is to provide an image recording apparatus capable of making any deterioration in the image quality occurring on a recording medium less conspicuous or noticeable.

In order to solve the above-described problem, an image recording apparatus of the present disclosure includes: a conveyor configured to convey a recording medium in a conveyance direction; a carriage configured to move in a scanning direction crossing the conveyance direction; a recording head mounted on the carriage and including a nozzle row including a plurality of nozzles aligned in the conveyance direction; and a controller. The controller records an image on the recording medium by alternately executing a recording pass of causing the recording head to discharge a liquid from the plurality of nozzles toward the recording medium based on image data while causing the carriage to move in the scanning direction, and a conveying operation of causing the conveyor to convey the recording medium in the conveyance direction. In a case that the image is to be recorded and that the controller causes, in the conveying operation, the conveyor to convey the recording medium in the conveyance direction so that recording areas, on the recording medium, in which the image is recorded in two continuous recording passes as the recording pass performed continuously twice, respectively, partially overlap each other: (a) the controller records thinned-out images, in which different parts of a line image are thinned out based on mask data, by using different nozzles among the plurality of nozzles in each of the two continuous recording passes, so as to record the line image, the line image corresponding to one line in the scanning direction in an overlap area at which the recording areas partially overlap with each other in the two continuous recording passes; (b) in a case that a moving direction in the scanning direction of the carriage in one of the two continuous recording passes is same as a moving direction in the scanning direction of the carriage in the other of the two continuous recording passes, the controller makes a length in the conveyance direction of the overlap area to be a first length; and (c) in a case that the moving direction in the scanning direction of the carriage in the one of the two continuous recording passes is different from the moving direction in the scanning direction of the carriage in the other of the two continuous recording passes, the controller makes the length in the conveyance direction of the overlap area to be a second length which is shorter than the first length.

In the present disclosure, in the case that the moving direction in the scanning direction of the carriage in one of the two continuous recording pass is same as the moving direction in the scanning direction of the carriage in the other of the two continuous recording passes, the length in the conveyance direction of the overlap area is longer than that in another case in which the moving direction in the scanning direction of the carriage in one of the two continuous recording pass is reverse to the moving direction in the scanning direction of the carriage in the other of the two continuous recording passes. As a result, it is possible to suppress, more reliably, any occurrence of streak-shaped unevenness in density or concentration (density unevenness) along the scanning direction on the recording medium. On the other hand, in the case that the moving direction in the scanning direction of the carriage in one of the two continuous recording passes is different from the moving direction in the scanning direction of the carriage in the other of the two continuous recording passes, the length in the conveyance direction of the overlap area is shorter than that in the case that the moving direction in the scanning direction of the carriage in one of the two continuous recording passes is same as the moving direction in the scanning direction of the carriage in the other of the two continuous recording passes. As a result, the degradation in the image quality occurring on the overlap area, due to any deviation in landing positions in the scanning direction of the liquid on the recording medium, can be made less conspicuous.

BRIEF DESCRIPTION OF THE DRAWINGS

FIG. 3A is a cross-sectional view taken along a line IIIA-IIIA in FIG. 2, and FIG. 3B is a view of FIG. 2 as seen from a direction of an arrow IIIB.

FIG. 5 is a block diagram depicting the electrical configuration of the printer.

FIGS. 6A, 6B and 6C each depict an area in which an image is recorded by two continuous recording passes, wherein FIG. 6A depicts a case that the image is recorded in a unidirectional recording mode; FIG. 6B depicts a case that an amount of deviation in the scanning direction of landing of an ink is small and that the image is recorded in a bidirectional recording mode; and FIG. 6C depicts a case that the amount of deviation in the scanning direction of landing of the ink is great and that the image is recorded in the bidirectional recording mode.

FIGS. 8A, 8B and 8C are each a view for explaining actual mask data and a corresponding relationship between the actual mask data and the reference mask data, wherein FIG. 8A is a view depicting an example of a case that a conveyance length of the overlap area is a length E1, FIG. 8B is a view depicting an example of a case that the conveyance length of the overlap area is a length E2, and FIG. 8C is a view depicting an example of a case that the conveyance length of the overlap area is a length E3.

FIGS. 13A and 13B depict a view for explaining about degradation in image quality in an overlap part in an image recorded by two continuous scans, wherein FIG. 13A depicts a case that any deviation in the landing does not occur in the bidirectional recording, and FIG. 13B depicts a case that a deviation in the landing occurs in the bidirectional recording.

DESCRIPTION OF THE EMBODIMENTS

Figure 1:
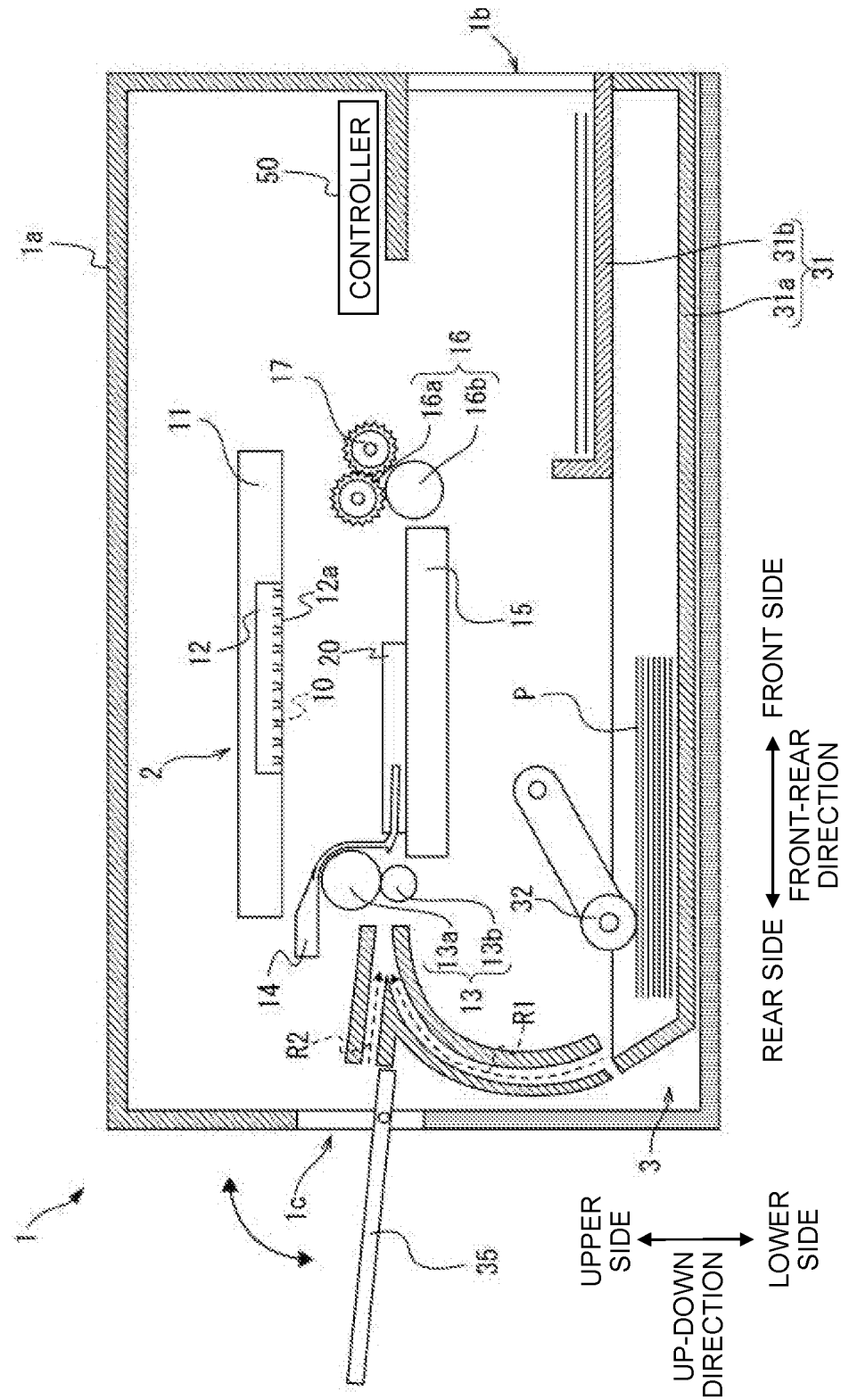
FIG. 1 is a vertical cross-sectional view schematically depicting the internal configuration of a printer.
Figure 2:
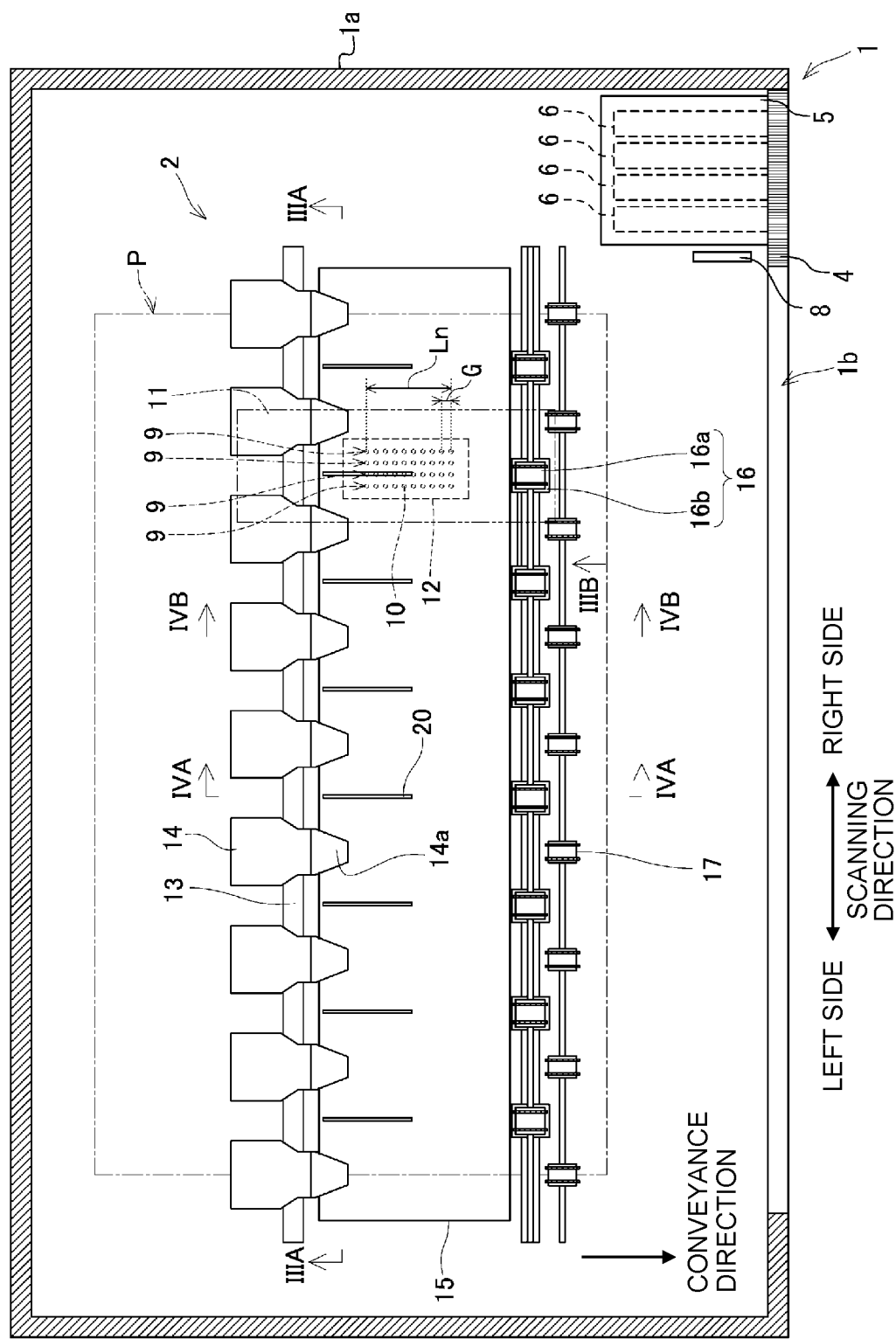
FIG. 2 is a plan view of a recording part in FIG. 1.

In the following, an ink-jet printer 1 will be explained, as an example of an image recording apparatus. In the following, the respective directions which are the front and rear, the left and right, and the up and down as depicted in FIGS. 1 and 2 are defined as the front-and-rear direction, the left-and-right direction, and the up-down direction, respectively, of the printer 1.

Generally, in an ink-jet printer capable of performing unidirectional and bidirectional recordings, discharging velocity of an ink, discharge timing of the ink, etc., and the like are set so that the ink lands at ideal landing positions in each of the unidirectional and bidirectional recordings. However, the landing positions of the ink are deviated from the ideal landing positions, in some cases, due to various factors such a situation that a gap between the nozzle and the recording sheet is different from a presumed gap, etc. In the unidirectional recording, since the ink-jet head moves in the same direction in two continuous scans, a flying direction in the scanning direction of the ink discharged from the nozzle is same in the two continuous scans. In contrast, in the bidirectional recording, the ink-jet head moves in mutually opposite directions in the two continuous scans, respectively. Therefore, in the bidirectional recording, the flying directions in the scanning direction of the ink discharged from the nozzle in the two continuous scans are opposite to each other. In a case that the landing positions of the ink are deviated from the ideal landing positions, consequently, landing positions in the scanning direction of the ink on the recording sheet are deviated significantly between two continuous scans in the bidirectional recording, as compared to the case of the unidirectional recording.

Figure 13A:
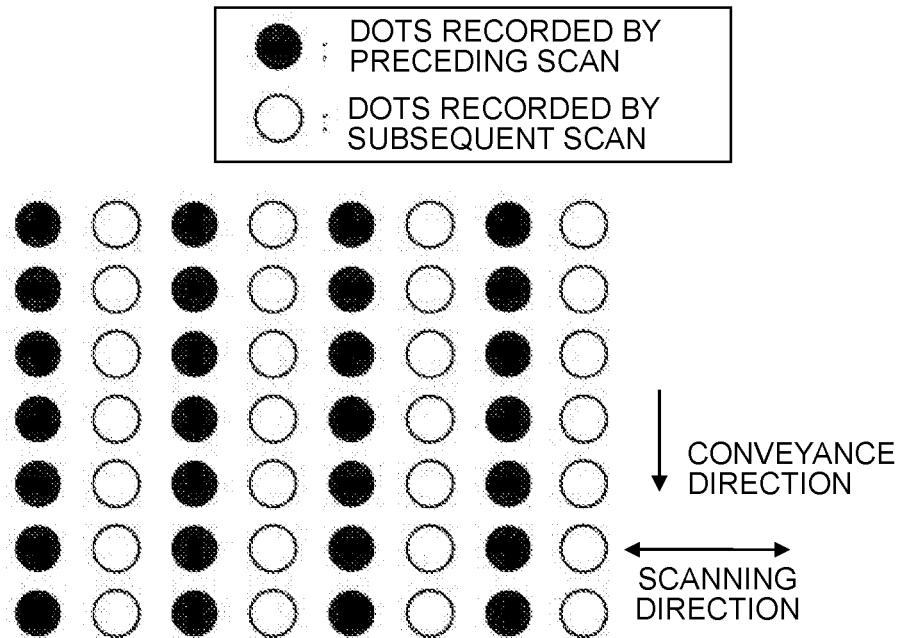
Figure 13B:
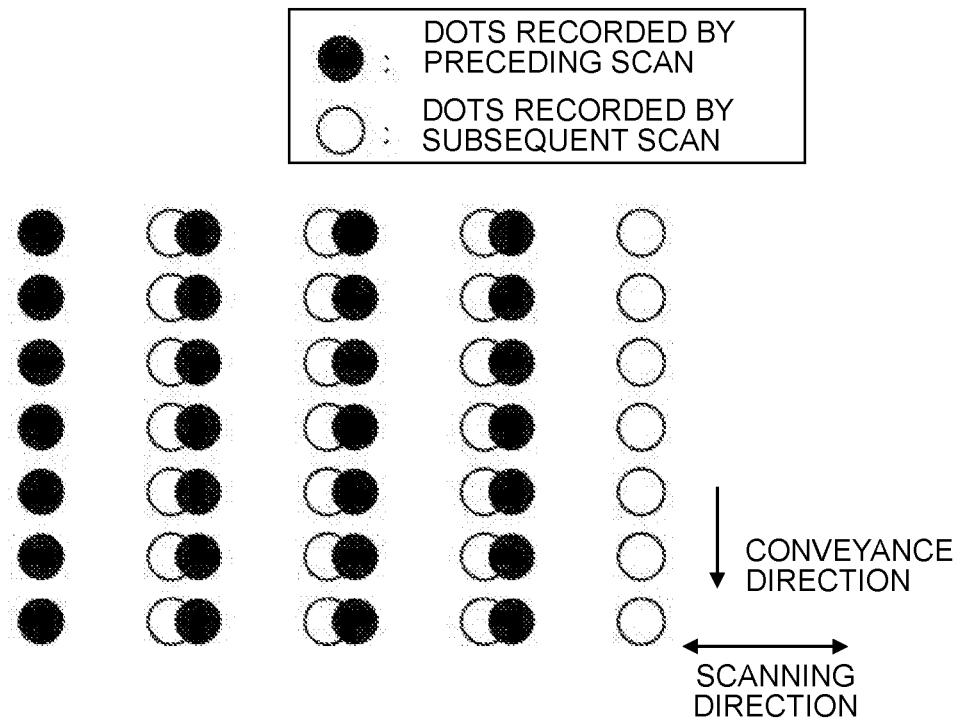

The ink-jet printer 1 adopts a recording system in which the recording sheet is conveyed so that images to be recorded by a plurality of scans, respectively, partially overlap each other, and the images are recorded by interpolating each other by using different nozzles in each of the plurality of scans at the overlap parts of the images, as described above. In a case of recording an image by the partial multi-scan, a line image corresponding to one line of the scanning direction in an overlap part of partially overlapping images of the image is recorded by using nozzles which are different from each other in the two continuous scans, as described above. Such a case is considered that images are recorded by performing two continuous scans in the bidirectional recording and that the ink lands at ideal landing positions. In such a case, intervals between dots (dot intervals) in the scanning direction in the overlap part of the images are equally spaced, as depicted in FIG. 13A. On the other hand, in a case that the landing positions of the ink are deviated from the ideal landing positions, there is such a fear that any light and shade (non-uniformity in density) might be caused in the overlap part of the images, due to the deviation in the landing positions of the ink between the two continuous scans, as depicted in FIG. 13B. Namely, there is such a fear a part in which the dot intervals in the scanning direction between dots recorded by a preceding scan and dots recorded by a subsequent scan are narrower than an ideal dot interval and a part in which the dot intervals are wider than the ideal dot interval might be generated. Therefore, in a case that the two continuous scans are performed by the bidirectional recording and that a length in the conveyance direction of the overlap part of the images recorded by the two continuous scans is long, there is such a fear that any degradation in the image quality occurring in the overlap part might be conspicuous. An object of the ink-jet printer 1 according to the present embodiment is to suppress any degradation in the image quality occurring in such an overlap part.

Generally, there are considered such a case that a user using the ink-jet printer attaches greater importance to the printing velocity and such a case that the user attaches greater importance to the print quality. For example, in a case of performing draft printing, it is desired to increase the printing velocity rather than to improve the printing quality. In such a case, the bidirectional recording is suitable. In reciprocating movement in the scanning direction of the ink-jet head in the bidirectional recording, the printing can be performed not only in a forward path but also in a return path of the reciprocating movement, and thus the printing velocity can be increased as compared to the unidirectional recording. In contrast, in a case of performing high-quality printing such as photographic printing, it is desired to improve the printing quality rather than to increase the printing velocity. In such a case, the unidirectional recording is suitable. As described above, in the unidirectional recording, since the ink-jet head moves in the same direction in two continuous scans, the flying direction in the scanning direction of the ink discharged from the nozzle is same in the two continuous scans. Therefore, even in such a case that the landing positions of the ink are deviated from the ideal landing positions, the deviation in the main scanning direction of landing positions of the ink on the recording paper in the unidirectional recording is small, as compared to the bidirectional recording.

Further, from the viewpoint of increasing the printing velocity, it is desired that, in the case of recording the image by the partial multi-scan, a length in the conveyance direction of the overlap part of the images is made to be short as much as possible. However, in a case that the length in the conveyance direction of the overlap part of the images is made to be short, then, for example, in such a case that the conveyance of the recording medium in the conveyance direction is deviated from an ideal conveyance amount due to any reason, there is a high possibility that a white streak, etc., might be generated in the overlap part of the images. In view of this, from the viewpoint of improving the print quality, it is desired to make the length in the conveyance direction of the overlap part of the images to be as long as possible in the case of performing the recording of the images by the partial multi-scan. One of the objects of the ink-jet printer 1 according to the present embodiment is to realize both of increased printing velocity and improved print quality.

As depicted in FIGS. 1 and 2, the ink-jet printer 1 has a casing 1*a* of which shape is a substantially rectangular parallelepiped. As depicted in FIG. 1, a recording part 2, a feeding part 3 arranged at a location under or below the recording part 2, and a controller 50 which controls operations of the recording part 2 and the feeding part 3, etc., are accommodated in the casing 1*a*.

An opening 1*b* is formed in a wall part on the front side of the casing 1*a*. A paper feed cassette 31 of the feeding part 3 is detachably installed in or attached to a lower part of the opening 1*b*. A supply port 1*c* via which a sheet-like shaped recording paper sheet P is fed into (to the inside of) the casing 1*a* is formed in a wall part on the rear side of the casing 1*a*.

Further, as depicted in FIG. 2, an opening and closing lid 4 is attached to a wall part, on the front side of the casing 1*a*, at a location on the right side with respect to the opening 1*b*. A holder 5 is arranged at the back (depth) side of the opening and closing lid 4. Four ink cartridges 6 storing inks of four colors (black, yellow, cyan, and magenta) are installed in the holder 5 such that each of the four ink cartridges 6 is detachable from the holder 5. The holder 5 is provided with an attachment/detachment sensor 7 (see FIG. 5) which detects attachment and detachment of the respective ink cartridges 6. Further, a temperature sensor 8 which measures the environmental temperature is provided in the vicinity of the holder 5.

As depicted in FIG. 1, a supply passage R1 (corresponding to a "first medium-supply passage" of the present disclosure) which is a substantially C-shaped and which extends from the feeding part 3 and arrives at the recording part 2, and a supply passage R2 (corresponding to a "second medium-supply passage" of the present disclosure) which is substantially linear-shaped and which extends from the supply port 1*c* and arrives at the recording part 2 are formed in the casing 1*a*.

The feeding part 3 has a paper feed cassette 31 which is installed in the opening 1*b* of the casing 1*a*, and a pick-up roller 32 which picks up the recording paper sheet P from the paper feed cassette 31. The paper feed cassette 31 includes a main tray 31*a* (corresponding to a "first tray" of the present disclosure) supporting the recording paper sheet P and a paper discharge tray 31*b* provided at a location above the main tray 31*a*. The pick-up roller 32 is arranged at a location above the main tray 31*a*, and is configured to be rockable (rotatable) about a rotational shaft provided in the casing 1*a*. The pick-up roller 32 is driven by a paper feed motor 33 (see FIG. 5) so as to take out, one by one, recording paper sheets P from the main tray 31*a* of the paper feed cassette 31. A recording paper sheet P taken out by the pick-up roller 32 is supplied to the recording part 2 along the supply passage R1. Note that the supply passage R1 is a substantially C-shaped passage or path as described above, and thus the front surface and the rear surface of the recording paper sheet P are reversed in a case that the recording paper sheet P is supplied to the recording part 2 along the supply passage R1.

Further, a manual feed tray 35 (corresponding to a "second tray" of the present disclosure) is attached to the casing 1*a*. The manual feed tray 35 may take a closed posture at which the manual feed tray 35 closes the supply port 1*c* and an open posture at which the manual feed tray 35 opens (releases) the supply port 1*c* (see FIG. 1). In a case that the manual feed tray 35 assumes the open posture, the user can insert the recording paper sheet P through the supply port 1*c* along the supply passage R2 until the recording paper sheet P reaches a conveying roller pair 13 which will be described later on. In this situation, the manual feed tray 35 supports the recording paper sheet P in a state that the recording paper sheet P is brought into contact with the conveying roller pair 13. Since the supply passage R2 is a substantially linear passage, the front surface and the rear surface of the recording paper sheet P are not reversed in a case that the recording paper sheet P is supplied to the recording part 2 along the supply passage R2.

Next, the recording part 2 will be explained. As depicted in FIGS. 1 to 4, the recording part 2 is provided with a carriage 11, an ink-jet head 12 (corresponding to a "recording head" of the present disclosure), the conveying roller pair 13, nine corrugate plates 14, a platen 15, eight discharge roller pairs 16, nine corrugated spurs 17, etc. Note that in FIG. 2, however, in order that the corrugate plates 14, ribs 20 (to be described later on), etc., can be easily seen, the carriage 11 is illustrated by a two-dot chain line, and members which are disposed at a location below the carriage 11 and which are actually not visible by being hidden by the carriage 11 are illustrated by a solid line. Further, a guide rail which supports the carriage 11, etc., is omitted in the illustration of FIG. 2.

The carriage 11 is movably supported by a non-illustrate guide rail along the scanning direction (left-right direction). The carriage 11 is connected to a carriage motor 56 (see FIG. 5) via a non-illustrate belt, etc., in a case that the carriage motor 56 is driven, the carriage 11 moves in a reciprocating manner, with the left-right direction as the scanning direction.

The ink-jet head 12 is installed in the carriage 11, and moves in the reciprocating manner in the scanning direction, together with the carriage 11. Further, the ink-jet head 12 ejects or discharge the ink from a plurality of nozzles 10 formed in an ink discharge surface 12a which is the lower surface of the ink-jet head 12. The plurality of nozzles 10 are aligned over a length Ln at a predetermined nozzle interval G in the conveyance direction (front-rear direction) which is orthogonal to the scanning direction so as to form a nozzle row (nozzle array) 9. Further, the ink-jet head 12 has four pieces of the nozzle row 9 which are arranged side by side in the scanning direction. Furthermore, the black, yellow, cyan, and magenta inks are discharged from the plurality of nozzles 10, in an order from a nozzle row 9 which is included in the four nozzle rows 9 and which is located on the right (rightmost) side in the left-right direction. The ink-jet head 12 is connected to the holder 5 by four tubes (of which illustration is omitted in the drawings). With this configuration, the four color inks of the four ink cartridges 6 installed in the holder 5 are supplied to the ink-jet head 12 via the four tubes, respectively. In the present embodiment, each of the inks stored in the ink-jet head 12 is a pigment ink.

The conveying roller pair 13 (corresponding to an "upstream side roller pair" of the present disclosure) is located on the upstream side in the conveyance direction with respect to the ink-jet head 12. The conveying roller pair 13 has an upper roller 13a and a lower roller 13b, and these rollers 13a and 13b nip, in the up-down direction therebetween, the recording paper sheet P fed from the feeding part 3 and convey the recording paper sheet P in the conveyance direction. The upper roller 13a is a drive roller which is driven by a conveying motor 57 (see FIG. 5). The lower roller 13b is a driven roller which rotates in conjunction with the rotation of the upper roller 13a.

The nine corrugate plates 14 extend from a position, at which the nine corrugate plates 14 overlap with the conveying roller pair 13, up to a position on the downstream side in the conveyance direction with respect to the conveying roller pair 13, and are arranged at equal intervals therebetween in the scanning direction. Each of the corrugate plates 14 has a pressing part 14a at an end part thereof on the downstream side in the conveyance direction, and presses the recording paper sheet P from thereabove by the pressing part 14a.

The platen 15 is arranged on the downstream side in the conveyance direction with respect to the conveying roller pair 13 so as to face or to be opposite to the ink discharge surface 12a. The platen 15 extends in the scanning direction over the entire length of a moving range of the carriage 11 in a case that recording of an image is performed. Eight ribs 20 are formed in the upper surface of the platen 15. The eight ribs 20 each extend in the conveyance direction and are aligned at equal intervals therebetween so that each of the eight ribs 20 is positioned between the corrugate plates 14 included in the nine corrugate plates 14 and adjacent to each other in the scanning direction. Further, the ribs 20 support the recording paper sheet P from therebelow.

Here, an upper end of each of the ribs 20 is positioned at a location above the pressing part 14a. Thus, each of the ribs 20 supports the recording paper sheet P from therebelow, at the location above a position at which the pressing part 14a presses the recording paper sheet P.

Eight sets of the discharge roller pair 16 (corresponding to a "downstream-side roller pair" of the present disclosure) are located on the downstream side in the conveyance direction with respect to the ink-jet head 12. Further, the position in the scanning direction of each of the discharge roller pairs 16 is substantially same as that of one of the ribs 20. Each of the discharge roller pairs 16 has an upper roller 16a and a lower roller 16b; the discharge roller pairs 16 receive the recording paper sheet P from the conveying roller pair 13, nip the recording paper sheet P in the up-down direction with these rollers 16a and 16b, and convey the recording paper sheet P further in the conveyance direction. Further, the discharge roller pairs 16 discharge the recording paper sheet P toward the discharge tray 31b. The lower roller 16b is a driving roller driven by the conveying motor 57 (see FIG. 5). The upper roller 16a is a spur, and is a driven roller which rotates in conjunction with the rotation of the upper roller 16b. Here, although the upper roller 16a makes contact with a recording surface of the recording paper sheet P after recording has been performed thereon, the upper roller 16a is a spur, rather than a roller of which outer circumferential surface is flat, and thus the ink(s) on the recording paper sheet P is (are) less likely to adhere to the upper roller 16a. Note that the conveying roller pair 13 and the discharge roller pairs 16 which convey the recording paper sheet P are combined to thereby collectively correspond to a "conveyor" of the present disclosure.

The nine corrugated spurs 17 are arranged on the downstream side in the conveyance direction with respect to the discharge roller pairs 16, and press the recording paper sheet P from thereabove. Further, the positions in the scanning direction of the nine corrugated spurs 17 are substantially same as those of the pressing parts 14a of the nine corrugate plates 14, respectively. Furthermore, since each of the corrugated spurs 17 is a spur, rather than a roller of which outer circumferential surface is flat, and thus the ink(s) on the recording paper sheet P is (are) less likely to adhere to the corrugated spurs 17.

Note that the number of the corrugate plate 14 and the number of the discharge roller pair 16, and the number of the rib 20 and the number of the corrugated spur 17 are examples, and these numbers may be different from those as described above. Each of the number of the corrugate plate 14 and the number of the discharge roller pair 16, as well as the number of the rib 20 and the number of the corrugated spur 17 may be at least one.

Further, the recording paper sheet P is supported from therebelow by the eight ribs 20 and the eight lower rollers 16b, and pressed from thereabove by the pressing parts 14a of the nine corrugate plates 14 and by the nine corrugated spurs 17, and thus the recording paper sheet P is bent so as have a wave-like shape (corrugated shape) along the scanning direction, as depicted in FIGS. 3A and 3B.

Further, the height of the recording paper sheet P allowed to have the wave-like shape is maximized, in the scanning direction, at a position Pt at which the respective ribs 20 and the respective discharge roller pairs 16 are arranged, and the height of the recording paper sheet P allowed to have the wave-like shape is minimized, in the scanning direction, at a position Pb at which the pressing parts 14a of the respective corrugate plates 14 and the respective corrugated spurs 17 are arranged. Namely, the recording paper sheet P has such a wave-like shape in which a ridge part protruding toward the ink discharge surface 12a, with the position Pt as the center, and a valley part recessed away from the ink discharge surface 12a with respect to the ridge part, with the position Pb as the center, are arranged side by side alternately.

Next, the electrical configuration of the printer 1 will be described. The operation of the printer 1 is controlled by the controller 50. As depicted in FIG. 5, the controller 50 include a CPU (Central Processing Unit) 51, a ROM (Read Only Memory) 52, a RAM (Random Access Memory) 53, a flash memory 54, an ASIC (Application Specific Integrated Circuit) 55 including various kinds of control circuits, etc. The attachment/detachment sensor 7, the temperature sensor 8, the ink-jet head 12, the paper feeding motor 33, the carriage motor 56, the conveying motor 57, etc., are electrically connected to the ASIC 55.

A program which is executed by the CPU 51, various kinds of fixed data, etc., are stored in the ROM 52. The RAM 53 temporarily stores data required for executing a program, image data as an object of recording (object to be recorded), etc. The flash memory 54 stores basic mask data U which will be descried later on, etc.

Note that the controller 50 may be configured such that only the CPU 51 performs the various kinds of processing or that only the ASIC 55 performs the various kinds of processing, or that the CPU 51 and the ASIC 55 perform the various kinds of processing in a cooperative manner. Alternatively, the controller 50 may be configured such that one CPU 51 singly performs the processing, or that a plurality of pieces of the CPU 51 perform the processing in a sharing manner. Still alternatively, the controller 50 may be configured such that one ASIC 55 singly performs the processing, or that a plurality of pieces of the ASIC 55 perform the processing in a sharing manner.

Further, the controller 50 controls the ink-jet head 12, the carriage motor 56, etc., based on a recording instruction (recording command) inputted from an external apparatus 200 such as a PC, etc., and records an image on the recording paper sheet P. Specifically, the controller 50 performs recording of the image on the recording paper sheet P by alternately performing a recording pass of discharging the ink from the plurality of nozzles 10 of the ink-jet head 12 toward the recording paper sheet P, based on image data stored in RAM 53, while causing the carriage 11 to move in the scanning direction, and a conveying operation of conveying the recording paper sheet P in the conveyance direction by the conveying roller pair 13 and the discharge roller pairs 16.

Note that as described above, since the recording paper sheet P is allowed to have the wave-like shape along the scanning direction, a gap between the ink discharge surface 12a and the recording paper sheet P changes (varies) along the scanning direction. For this reason, in the recording pass, a discharge timing of the ink from the nozzles 10 is adjusted in accordance with the gap between the recording paper sheet P and the ink discharge surface 12a at each of positions, in the scanning direction on the recording paper sheet P, at which the ink is made to land thereon to form a dot. Note that this adjustment of the discharge timing is performed on the premise that the recording paper sheet P is held in a presumed wave-like shape and that the discharging velocity of the ink from the nozzle 10 is a presumed discharging velocity.

Further, the printer 1 of the present embodiment performs recording of an image selectively in any one of three recording modes which are: a unidirectional recording mode, a bidirectional recording mode, and a partial unidirectional recording mode. These recording modes will be explained below.

The unidirectional recording mode is a recording mode in which the ink is discharged from the plurality of nozzles 10 only in a case that the carriage 11 is moved toward one side (right side in the present embodiment) in the scanning direction. Therefore, in the unidirectional recording mode, moving directions of the carriage 11 in each of two continuous recording passes are same in all the recording passes performed in a case that an image is to be recorded on one piece of the recording paper sheet P. Namely, in the respective two continuous recording passes, a moving direction of the carriage 11 in a preceding recording pass is same as a moving direction of the carriage 11 in a subsequent recording pass.

The bidirectional recording mode is a recording mode in which the ink is discharged from the plurality of nozzles 10 in a case that the carriage 11 is moved toward either of the one side and the other side in the scanning direction. Therefore, in the bidirectional recording mode, the moving direction of the carriage is alternately changed in all the recording passes performed in a case of recording an image on one pieces of the recording paper sheet P. Namely, in the respective two continuous recording passes, the moving direction of the carriage 11 in the preceding recording pass is different from the moving direction of the carriage 11 in the subsequent recording pass.

In the unidirectional recording mode, after one time of the recording pass is executed by moving the carriage 11 to the right side, it is necessary to perform a return operation of moving the carriage 11 to the left side before starting the subsequent recording pass. On the other hand, in the bidirectional recording mode, there is no need to perform the return operation after one time of the recording pass is performed. Therefore, the bidirectional recording mode is capable of improving the throughput as compared with the unidirectional recording mode. On the other hand, in the bidirectional recording mode, the flying directions in the scanning direction of the ink discharged from the nozzles 10 in the two continuous recording passes are, unlike in the unidirectional recording mode, opposite to each other. Therefore, in the bidirectional recording mode, the landing positions in the scanning direction of the ink on the recording paper sheet P are easily deviated between the two continuous recording passes, as compared with the unidirectional recording mode. The reason therefor is explained below.

As described above, the adjustment of the discharge timing in the recording pass is performed on the assumption that the recording paper sheet P is held in the presumed wave-like shape and that the discharging velocity of the ink from the nozzle 10 is the presumed discharging velocity. However, the actual shape of the recording paper sheet P might be greatly different from the presumed wave-like shape, depending on the environmental temperature and/or the kind of the recording paper sheet P, in some cases. For example, in a case of a recording paper sheet P, of which rigidity is relatively high, such as glossy paper, the actual shape thereof is close to the presumed wave-like shape even at a part thereof separated and away from the corrugate plate 14. On the other hand, in a case of a recording paper sheet P, of which rigidity is relatively low, such as plain paper, the actual shape thereof is greatly different from the presumed shape, at a part thereof separated and away from the corrugate plate 14, in some cases.

Further, the actual discharging velocity of the ink might be greatly different from the presumed discharging velocity, in some cases. Specifically, the discharging velocity of the ink varies depending on the viscosity of the ink. Further, the viscosity of the ink is changed depending on the environmental temperature. Thus, as the environmental temperature changes, the actual discharging velocity of the inks might be greatly different from the presumed discharging velocity, in some cases. In addition, in a case that the ink stored in the ink cartridge 6 is a pigment ink, a large amount of the pigment sediments (settles) at the bottom of the ink cartridge 6 under a condition that the ink is left in the ink cartridge 6 to stand still for a long period of time. As a result, the pigment concentration of the pigment ink is locally high at the bottom of the ink cartridge 6, and the viscosity of the pigment ink is also very high locally at the bottom of the ink cartridge 6. In a case that the pigment ink which becomes highly viscous by the sedimentation (settling) of the pigment is supplied to the inside of the nozzle 10, the discharging velocity of the ink is greatly lowered from the presumed velocity. Note that an amount of the sedimentation of the pigment ink in the ink cartridge 6 increases further as an elapsed time since a point of the time at which the ink cartridge 6 has been installed in the holder 5 becomes longer, and increases further as a supply amount of ink, supplied since the point of time at which the ink cartridge 6 has been installed in the ink-jet head 12, is smaller.

As described above, in a case that the shape of the recording paper sheet P is greatly different from the presumed wave-like shape, and/or in a case that the discharging velocity of the ink from the nozzle 10 is greatly different from the presumed discharging velocity, the landing positions of the ink is consequently deviated from the ideal landing positions, in the scanning direction. Here, in the unidirectional recording mode, the moving directions of the carriage 11 in the respective recording passes are the same. Therefore, even in a case that the landing positions of the ink are deviated from the ideal landing positions in each of the recording passes, an amount in which the landing positions of the ink on the recording paper sheet P recorded by the respective recording passes are deviated from each other in the scanning direction is small. On the other hand, in the bidirectional recording mode, in a case that an image is recorded, the moving direction of the carriage 11 in the recording pass mode is alternately changed. Therefore, in a case that landing positions of the ink are deviated from the ideal landing positions in each of the recording passes, the landing positions of the ink on the recording paper sheet P recorded in the recording pass in a case that the carriage 11 moves rightward and the landing positions of the ink on the recording paper sheet P recorded in the recording pass in a case that the carriage 11 moves leftward are greatly deviated with respect to the scanning direction. Therefore, in the unidirectional recording mode, the amount in which the landing positions of the ink are deviated in the scanning direction is small as compared to the bidirectional recording mode, and thus the quality of the image recorded on the recording paper sheet P is higher in the unidirectional recording mode, as compared to the bidirectional recording mode.

Next, the partial unidirectional recording mode will be described. The partial unidirectional recording mode is a recording mode of determining, regarding respective two continuous times of the recording pass (recording passes performed continuously two times; two continuous recording passes) among all the recording passes performed in a case of recording an image on one piece of the recording paper sheet P, whether the moving direction of the carriage 11 in the subsequent recording pass is made to be same as, or different from, the moving direction of the carriage 11 in the preceding recording pass, based on image data as an object to be recorded (recording object). In the following, the partial unidirectional recording mode will be described in detail.

As described above, in the four nozzle rows 9 formed in the ink discharge surface 12a of the ink-jet head 12, the black, yellow, cyan, and magenta inks are discharged in this order from the nozzle row 9, among the four nozzle rows 9, which is located on the right side. Therefore, in the recording pass in which the carriage 11 moves toward the right side, landing order of the inks of the respective colors in a case of forming one dot on the recording paper sheet P is an order of: black, yellow, cyan, and magenta. On the other hand, in the recording pass in which the carriage 11 moves toward the left side, landing order of the inks of the respective colors in a case of forming one dot on the recording paper sheet P is an order of: magenta, cyan, yellow, and black. Accordingly, a color difference (difference in tint) might occur between the case that the carriage 11 is recorded with the recording pass wherein the carriage 11 moves toward the right side and the case that the ink is recorded with the recording pass wherein the carriage 11 moves toward the left side, due to the difference in the landing order of the respective colors. In other words, even though the image data represents an image of the same color, an image recorded on the recording paper sheet P might appear as an image of a different color, in some cases. For this reason, in a case that the moving directions of the carriage 11 in the two continuous recording passes are different from each other, there is such a fear that a band-like unevenness (non-uniformity) in color due to the difference in the landing order of the inks might be conspicuous or noticeable between the images recorded by the two recording passes.

The magnitude of the color difference caused due to the landing order of the inks of the respective colors changes depending on the amounts of the inks of the respective colors used in the recording pass. For example, the above-described color difference is small in an image recorded by recording passes in which only the black ink is used, or an image recorded by a recording pass in which a color ink(s) such as cyan, magenta, yellow, etc., is (are) used whereas a usage amount(s) thereof is (are) small. In contrast, an image recorded by recording passes using a large amount(s) of the color ink(s) has a large color difference.

In view of the above-described situation, in the present embodiment, the controller 50 extracts partial image data corresponding to each of the recording passes from image data stored in RAM 53. Note that the image data is data in which a discharge amount of the ink to be discharged from the nozzle 10 in a case of forming dots on the recording paper sheet P is set, with respect to each of the dots, regarding each of the colors of the inks. The partial image data is data corresponding to all dots to be formed by the ink(s) discharged from the nozzle 10 in one time of the recording pass.

The controller 50 calculates an index value regarding the discharge amount of each of the inks of the respective colors based on the extracted partial image data, by using a predetermined calculation formula. The calculation formula for calculating the index value is a formula (expression) derived from a result of an experiment, etc., so that the index value becomes greater as an image in which the color difference caused by the landing order of the inks tends to be more conspicuous. Further, in a case that the calculated index value is not less than a predetermined value, the moving direction of the carriage 11 in the recording pass is restricted to being rightward (toward the right side). On the other hand, in a case that the calculated index value is less than the predetermined value, the moving direction of the carriage 11 of the recording pass is not restricted.

Therefore, in a case that the moving direction of the carriage 11 in the preceding recording pass, among the two continuous recording passes, is toward the left side, the controller 50 determines that the moving direction of the carriage 11 in the subsequent recording pass is made toward the right side. Further, in a case that the moving direction of the carriage 11 in the preceding recording pass is toward the right side and that the index value corresponding to the subsequent recording pass is less than the predetermined value, the controller 50 determines that the moving direction of the carriage 11 in the subsequent recording pass is made toward the left side. Namely, in these cases, the controller 50 determines that the moving direction of the carriage 11 in the subsequent recording pass is made to be different from the moving direction of the carriage 11 in the preceding recording pass. With this, the throughput can be improved.

On the other hand, in a case that, in the two continuous recording passes, the moving direction of the carriage 11 in the preceding recording pass is toward the right side and that the index value corresponding to the subsequent recording pass is not less than the predetermined value, the controller 50 determines that the moving direction of the carriage 11 in the subsequent recording pass is made toward the right side. Namely, the controller 50 determines that the moving direction of the carriage 11 in the subsequent recording pass is made to be same as the moving direction of the carriage 11 in the preceding recording pass. As described above, it is possible to suppress the occurrence of color unevenness caused due to the difference in landing order of the inks between the images recorded by the two the recording pass operations, respectively.

Figure 6A:
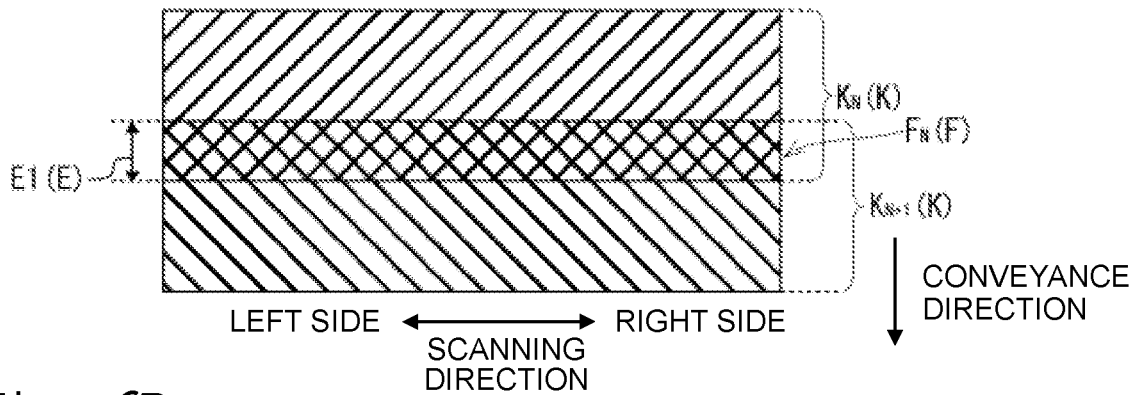
Figure 6B:
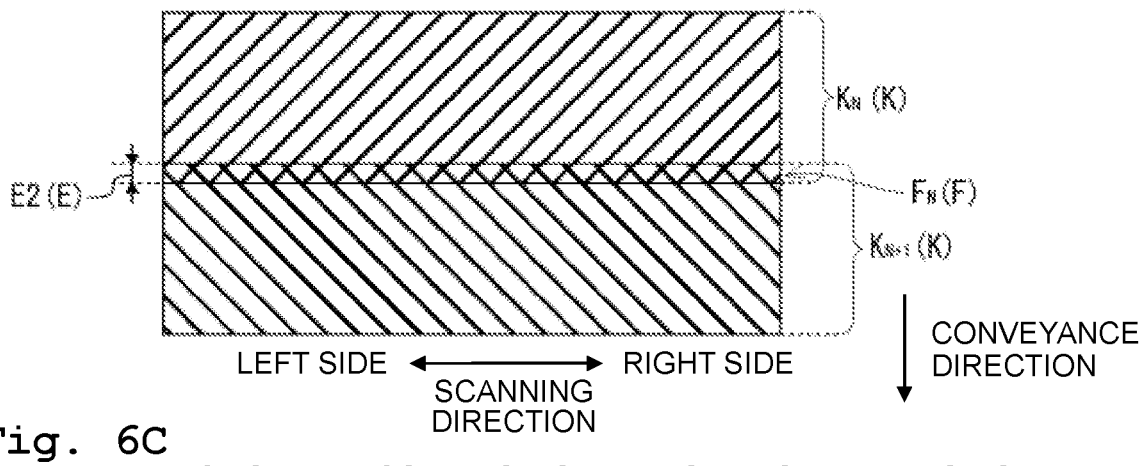
Figure 6C:
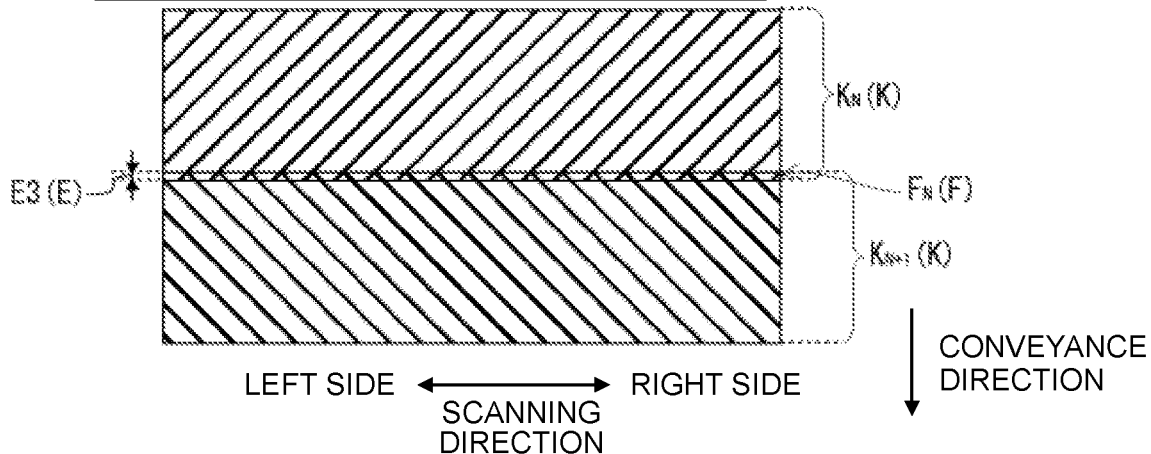

Next, an image to be recorded in the recording pass will be explained. As depicted in FIGS. 6A to 6C, in a case that the controller 50 records an image, the controller 50 conveys, in a conveying operation which is performed between two continuous recording passes, the recording paper sheet P only by a length which is shorter than the length Ln of each of the nozzle rows 9 so that a recording area K in which the image is recorded by a preceding recording pass included in the two continuous recording passes and a recording area K in which the image is recorded by a succeeding recording pass included in the two continuous recording passes partially overlap with each other. Further, in an overlap area F in which the recording areas K of the two continuous recording passes overlap partially with each other, the controller 50 records the image with these two continuous recording passes, while allowing the two continuous recording passes to compliment with each other. Namely, in the overlap area F, the controller 50 records a line image corresponding to (equivalent to) one line which is composed of a plurality of dots along the scanning direction, by a so-called multi-scan system of recording the image with (by performing) the two continuous recording passes. In this situation, the controller 50 uses different nozzles 10 in the two continuous recording passes, respectively, so as to record thinned-out images in which different parts of the line image are thinned out in the two continuous recording passes, respectively, based on mask data (to be described later on). With this, the thinned-out images which are recorded in the two continuous recording passes, respectively, are overlapped with each other in the overlap area F to thereby complete the line image.

As described above, by partially overlapping the recording areas K of the two continuous recording passes and by recording the image with the multi-scan system in the overlap area F, it is possible to suppress any occurrence of the degradation in the image quality, such as a white streak and/or unevenness in the density extending along the scanning direction, at a joint area of the images of the two continuous recording passes, which would be otherwise caused due to any variation in the conveyance amount of the recording paper sheet P. Note that in the following description, in a case of discriminating or distinguishing, regarding the recording area K, as to the image is recorded by a recording pass of which ordinal number, the recording area is indicated, for example, as a "recording area $K_N$" in such a case that the image is recorded by a Nth recording pass (recording pass of which ordinal number is N). Further, in the recorded image, there are consequently a plurality of overlap areas F. In the following, among the plurality of overlap areas F, an overlap area F of the recording area $K_N$ and a recording area $K_{N+1}$, is referred to as an "overlap area $F_N$".

Note that the effect of preventing any degradation in the image quality caused due to the variation in the conveyance amount of the recording paper sheet P becomes higher as a length E in the conveyance direction of the overlap area F (hereinafter referred simply as a "conveyance length E") is longer. However, as the conveyance length E of the overlap area F is longer, the unevenness in the density caused by the deviation in the landing positions of the ink in the scanning direction becomes more conspicuous.

As described above, in a case that the moving directions of the carriage 11 in the two continuous recording passes are different from each other, the landing positions in the scanning direction of the ink are deviated between the recording area $K_N$ in which the image is recorded by the Nth recording pass and the recording area $K_{N+1}$ in which the image is recorded by the N+1th recording pass, in some cases. As described above, in such a case that the landing positions of the ink are deviated between the recording area $K_N$ and the recording area $K_{N+1}$, any shading (light and shade) occurs along the scanning direction in each of the line images of the overlap area $F_N$. As a result, any degradation in the image quality, such as banding and/or grainy appearance, etc., is/are likely to occur in the overlap area $F_N$. This degradation in the image quality tends to be conspicuous in a case that the conveyance length E of the overlap area $F_N$ is long. In addition, this degradation in image quality is more conspicuous as the amount of deviation in the landing positions of the ink in the scanning direction between the recording passes is greater.

In view of this, in the present embodiment, the conveyance length E of the overlap area F is made to be different, depending on the condition. Specifically, there are provided three kinds of length E1, length E2, and length E3 each of which is settable as the conveyance length E of the overlap area F. The length E1, the length E2, and the length E3 becomes longer in the descending order. The length E1 corresponds to a "first length" of the present disclosure, and the length E2 and the length E3 each correspond to a "second length" of the present disclosure.

In the unidirectional recording mode, as described above, the amount of the deviation in the landing positions of the ink in the scanning direction is small between the recording passes. Therefore, in a case that the image is to be recorded in the unidirectional recording mode, the controller 50 sets the conveyance length E of the overlap area F to the length E1 which is the longest. With this, it is possible to suppress, in a more ensured manner, any degradation in the image quality caused by any variation in the conveyance amount of the recording paper sheet P.

On the other hand, in a case that an image it to be recorded in the bidirectional recording mode, the controller 50 firstly obtains deviation-related information related to the amount of the deviation in the landing positions of the ink in the scanning direction between the recording passes. Then, in a case that the controller 50 determines, based on the obtained deviation-related information, that the amount of deviation in the landing positions of the ink in the scanning direction is less than a predetermined amount, the controller 50 sets the conveyance length E of the overlap area F to the length E2; whereas in a case that the controller 50 determines that the amount of deviation is not less than the predetermined amount, the controller 50 sets the conveyance length E of the overlap area F to the length E3 which is the shortest. Note that the deviation-related information is information including media information regarding the kind of the recording paper sheet P, temperature information outputted from the temperature sensor 8, elapsed time information obtained from a time elapsed since a point of time at which the ink cartridge 6 has been installed and determined by the output from the attachment/detachment sensor 7, consumption information of the ink consumed from the point of time at which the ink cartridge 6 has been installed, etc. As described above, in a case that the image is to be recorded in the bidirectional recording mode, the conveyance length E of the overlap area F is made to be shorter as the amount of deviation in the landing positions of the ink in the scanning direction is greater between the recording passes. As a result, it is possible to make the degradation in the image quality, which occurs in the overlap area $F_N$, to be less conspicuous.

In the partial unidirectional recording mode, in a case that the moving direction of the carriage 11 in the subsequent recording pass is made same as the moving direction of the carriage 11 in the preceding recording pass in the two continuous recording passes, the conveyance length E of the overlap area F is set to the length E1. On the other hand, in the case that the moving direction of the carriage 11 in the subsequent recording pass is made different from the moving direction of the carriage 11 in the preceding recording pass, and in a case that the controller 50 determines that the amount of deviation is less than the predetermined amount, the controller 50 sets the conveyance length E of the overlap area F to the length E2; whereas in a case that the controller 50 determines that the amount of deviation is not less than the predetermined amount, the controller 50 sets the conveyance length E of the overlap area F to the length E3. By performing the setting as described above, it is possible to suppress any degradation in the image quality caused due to the variation in the conveyance amount of the recording paper sheet P, while making any degradation in the image quality occurring in the overlap area $F_N$ to be less conspicuous. In the present embodiment, the amount of deviation of the landing positions of the ink in the scanning direction corresponds to a "predetermined condition" of the present disclosure.

Next, an explanation will be given about mask data used in each of the recording passes. The reference mask data U is stored in the flash memory 54 (corresponding to a "storing part" of the present disclosure). The reference mask data U is mask data with respect to the recording area K in a case that the conveyance length E of the overlap area F is half the length Ln of the nozzle row 9 [Ln/2].

Figure 7:
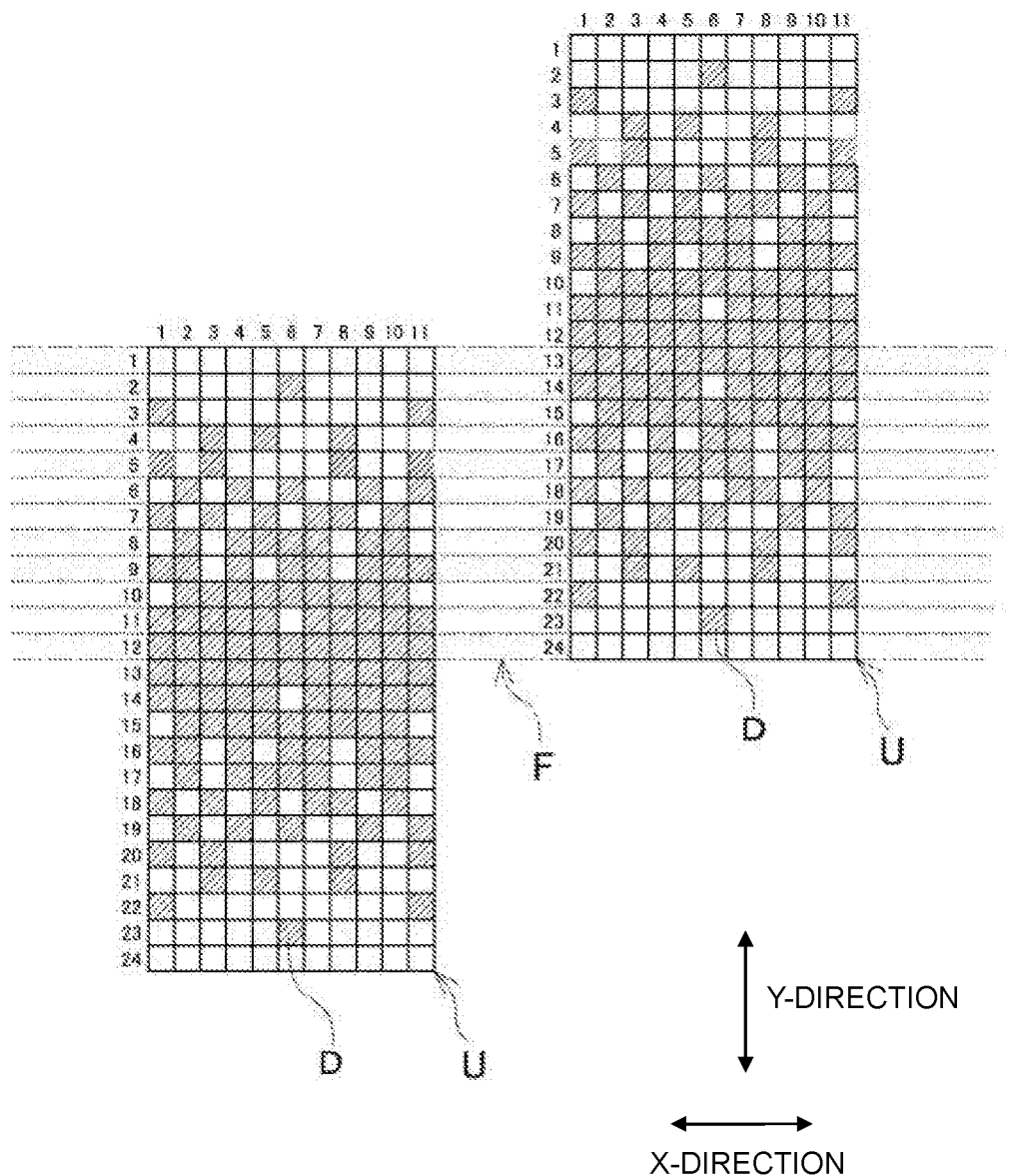
FIG. 7 is a view for explaining reference mask data, and a corresponding relationship between the reference mask data and an overlap area.

The reference mask data U is, for example, formed of a plurality pieces of dot data D which are arranged in a grid-like manner in an X-direction and a Y-direction which are orthogonal to each other, as depicted in FIG. 7. In FIG. 7, an example of the reference mask data U is depicted provided that, for the sake of convenience, the number of the nozzle 10 constructing the nozzle row 9 are twenty four (Ln=24×G). The X-direction and the Y-direction correspond to the scanning direction and the conveyance direction, respectively. In FIG. 7, reference numerals 1, 2, 3, . . . 10, 11 which are arranged side by side in the X-direction correspond to ordinal numbers of the dots (indicate as to the dots have which ordinal numbers), respectively, from the left side in the scanning direction of a line image. Specifically, dot data D which is I-th from the left side in the X-direction (I=1, 2, . . . 10, 11) corresponds to [I+(11×C)]th dot (C=0, 1, 2, . . . ) from the left side in the scanning direction of the line image. Further, in FIG. 7, reference numerals 1, 2, 3, . . . 23, 24 which are arranged side by side in the Y-direction indicate as correspondence to the nozzles 10 having which ordinal numbers, respectively, from the upstream side in the conveyance direction. Furthermore, in FIG. 7, a plurality of pieces of dot data D which are hatched mean that the discharge of ink from the nozzles 10 (formation of dots) based on the image data are allowed, whereas a plurality of pieces of dot data D which are not hatched mean that the discharge of ink from the nozzles 10 based on the image data are inhibited (these pieces of dot are thinned out).

Further, in the reference mask data U, a ratio of dot data D (dot data D to which the hatching is applied) allowing the discharge of the ink is greater as an array of dot data D is located closer to the central side in the Y-direction. Furthermore, in the reference mask data U, with respect to two arrays of the dot data D which are separated from each other with other twelve arrays of the dot data D intervened therebetween in the Y-direction (for example, in an array "1" of the dot data D and an array "13" of the dot data D in the Y-direction), the arrangements of dot data D allowing the discharge of the ink and another dot data D inhibiting the discharge of the ink are made to be reverse. With this, a thinned-out image recorded by thinning out the dot(s), from the above-described line image, based on one of the two arrays of the dot data D and another thinned-out image recorded by thinning out the dot(s), from the above-described line image, based on the other of the two arrays of the dot data D are overlapped with each other to thereby complete the above-described line image.

An actual conveyance length E of the overlap area $F_N$ is shorter than the length [Ln/2](=12×G) that is half the length Ln of the nozzle row 9. Corresponding to this situation, in the recording performed in the multi-scan system, a data part corresponding to the overlap area $F_N$ among the mask data of the recording area $K_N$ and the mask data of the recording area $K_{N+1}$ is determined by using, from the plurality of arrays of the dot data D constructing the reference mask data U, every [(Ln/2)/E] arrays of the dot data D, from the upstream side in the conveyance direction. More specifically, an upstream half part in the conveyance direction of these arrays of the dot data D is determined as the data part corresponding to the overlap area $F_N$ among the mask data with respect to the recording area $K_N$; and a downstream half part in the conveyance direction of these arrays of the dot data D is determined as the data part with respect to the overlap area $F_N$ among the mask data constructing the recording area $K_{N+1}$. In the following, for the sake of convenience of the explanation, the length E1, the length E2 and the length E3 of the conveyance length E of the overlap area F are made to be a length four times the nozzle interval G, a length three times the nozzle interval G, and a length two times the nozzle interval G, respectively.

Figure 8A:
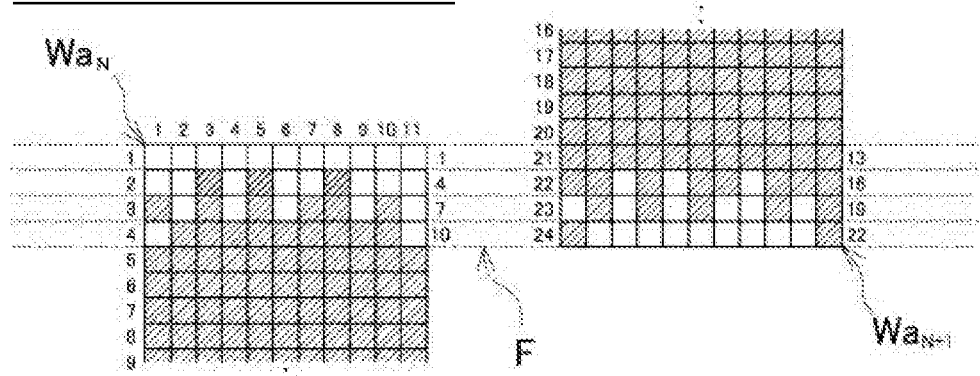

For example, in a case that the length E of the overlap area F is the length E1 which is four times the nozzle interval G; among eight arrays of the dot data D constructing the reference mask data U and which are every three (=[12×G]/[4×G]) arrays of the dot data D from the upstream side in the conveyance direction (for example, 1st, 4th, 7th, 10th, 13th, 16th, 19th and 22nd arrays of the dot data D from the upstream side in the conveyance direction), four arrays among these eight arrays of the dot data D which are disposed on the upstream side in the conveyance direction are determined as a data part corresponding to the overlap area $F_N$ among a mask data $Wa_N$ with respect to the recording area $K_N$, as depicted in FIG. 8A. Further, among these eight arrays of the dot data D, four arrays of the dot data D which are disposed on the downstream side in the conveyance direction are determined as a data part corresponding to the overlap area $F_N$ among a mask data $Wa_{N+1}$ with respect to the recording area $K_{N+1}$, as depicted in FIG. 8A.

Figure 8B:
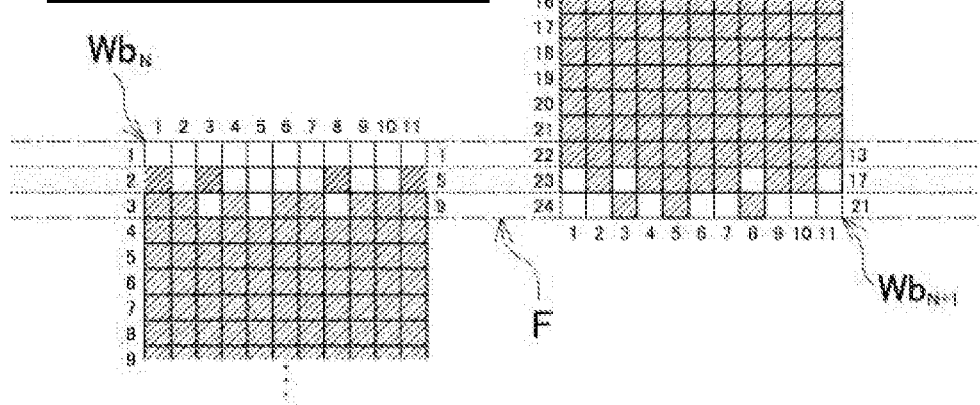

Similarly, for example, in a case that the length E of the overlap area F is the length E2 which is three times the nozzle interval G; among six arrays of the dot data D constructing the reference mask data U and which are every four (=[12×G]/[3×G]) arrays of the dot data D from the upstream side in the conveyance direction (for example, 1st, 5th, 9th, 13th, 17th and 21st arrays of the dot data D from the upstream side in the conveyance direction), three arrays among these six arrays of the dot data D which are disposed on the upstream side in the conveyance direction are determined as a data part corresponding to the overlap area $F_N$ among a mask data $Wb_N$ with respect to the recording area $K_N$, as depicted in FIG. 8B. Further, among these six arrays of the dot data D, three arrays of the dot data D which are disposed on the downstream side in the conveyance direction are determined as a data part corresponding to the overlap area $F_N$ among a mask data $Wb_{N+1}$ with respect to the recording area $K_{N+1}$, as depicted in FIG. 8B.

Figure 8C:
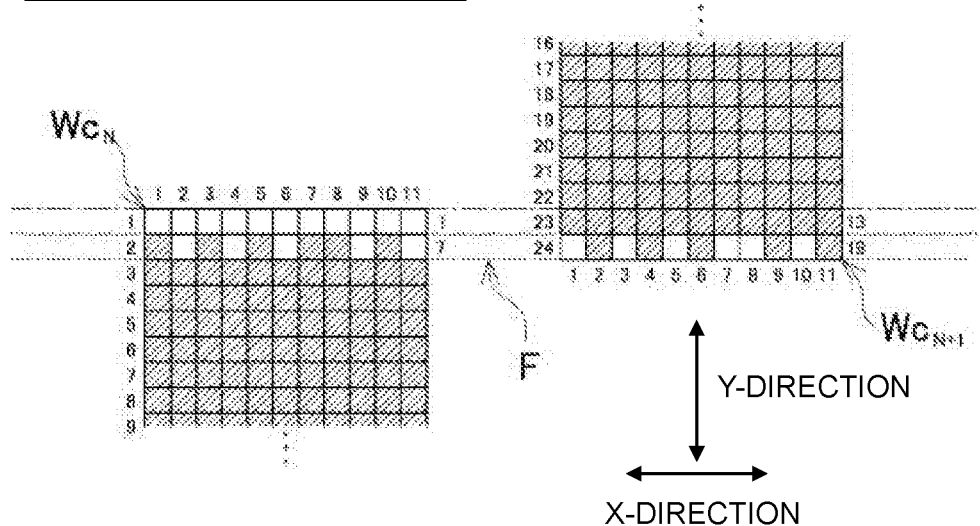

Similarly, for example, in a case that the length E of the overlap area F is the length E3 which is two times the nozzle interval G; among four arrays of the dot data D constructing the reference mask data U and which are every six (=[12×G]/[2×G]) arrays of the dot data D from the upstream side in the conveyance direction (for example, 1st, 7th, 13th and 19th arrays of the dot data D from the upstream side in the conveyance direction), two arrays among these four arrays of the dot data D which are disposed on the upstream side in the conveyance direction are determined as a data part corresponding to the overlap area $F_N$ among a mask data $Wc_N$ with respect to the recording area $K_N$, as depicted in FIG. 8C. Further, among these four arrays of the dot data D, two arrays of the dot data D which are disposed on the downstream side in the conveyance direction are determined as a data part corresponding to the overlap area $F_N$ among a mask data $Wc_{N+1}$ with respect to the recording area $K_{N+1}$, as depicted in FIG. 8C.

Furthermore, as depicted in FIGS. 8A to 8C, a data part, of the mask data, corresponding to an area which is different from the overlap area F in the recording area K is formed by arrays of the dot data D wherein all of the dot data D is dot data D allowing the discharge of the ink (hatched dot data D).

Here, reference numerals 1 to 24 affixed to the left side of the mask data $Wa_N$, the mask data $Wa_{N+1}$, the mask data $Wb_N$, the mask data $Wb_{N+1}$, the mask data $Wc_N$, the mask data $WC_{N+1}$ each indicate the correspondence to the nozzle 10 of which ordinal number from the upstream side in the conveyance direction; and reference numerals affixed to the right side (for example, the reference numerals "1", "7", "13" and "19" in FIG. 8C) of the mask data $Wa_N$, the mask data $Wa_{N+1}$, the mask data $Wb_N$, the mask data $Wb_N$, the mask data $Wc_N$, the mask data $WC_{N+1}$ each indicate the correspondence of the array of the dot data D, of the reference mask data U, to the nozzle 10 of which ordinal number from the upstream side in the conveyance direction.

Further, by performing the recording with the two continuous recording passes based on the above-described mask data, an array of the dot data D allocated to the nozzles 10, respectively in one of the two continuous recording passes and an array of the dot data D allocated to the nozzles 10, respectively, in the other of the two continuous recording passes become two arrays of the dot data D which are separated from each other with twelve arrays of the dot data D intervened therebetween in the conveyance direction in the reference mask data U, with respect to the image of each of the line images in the overlap area F. Namely, the line image is completed by overlapping thinned-out images recorded by these two continuous recording passes.

Next, an explanation will be given about control performed by the controller 50 in a case that an image is to be recorded on the recording paper sheet P in the printer 1. In the present embodiment, in a case that the recording instruction or command instructing the printer 1 to perform recording is inputted to the printer 1, the controller 50 performs a processing in accordance with a flow of FIGS. 9A to 9C so as to record the image on the recording paper sheet P.

Figure 9A:
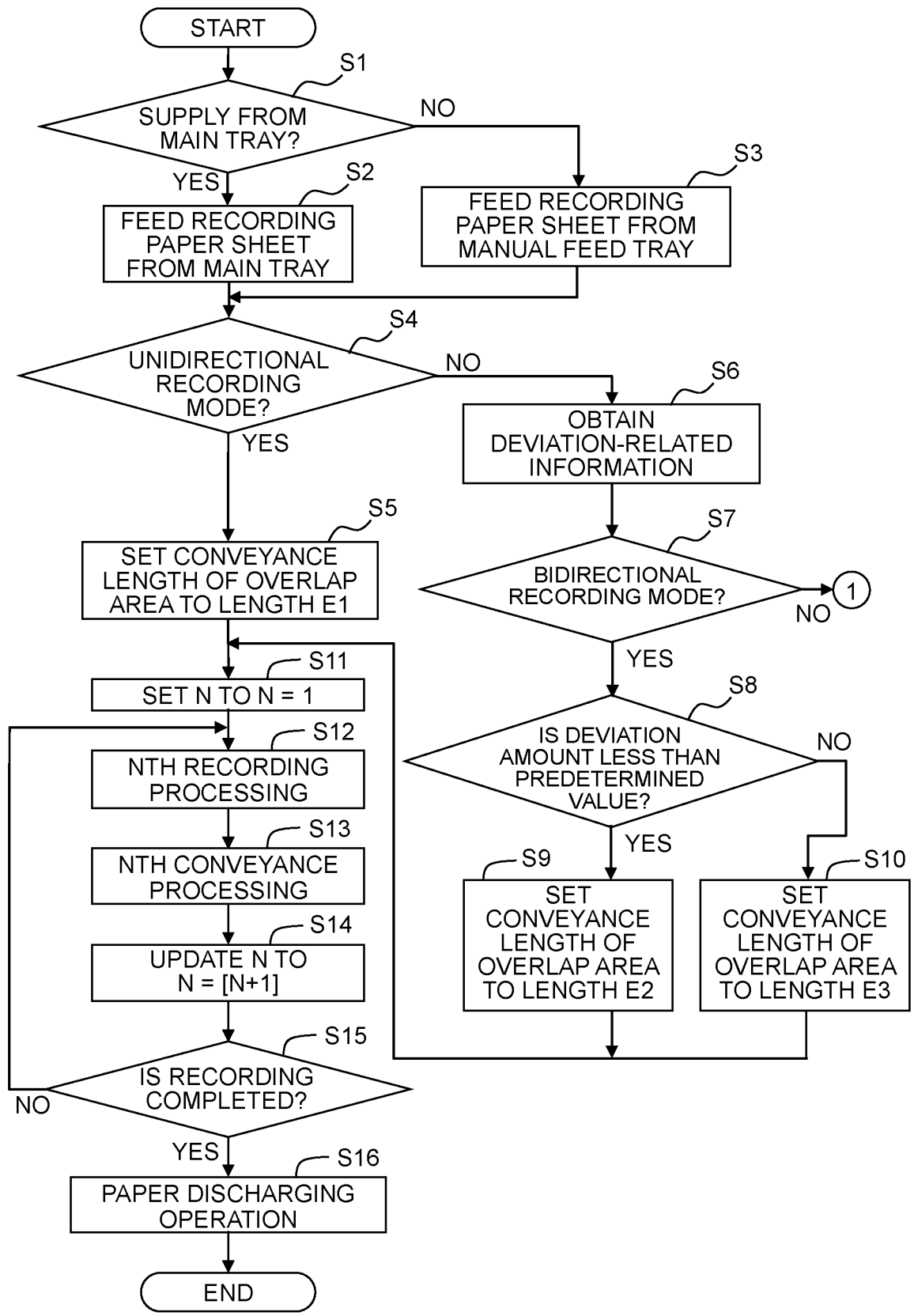
FIGS. 9A, 9B and 9C depict a flowchart indicating a flow of a processing in a case of preforming recording.
Figure 9B:
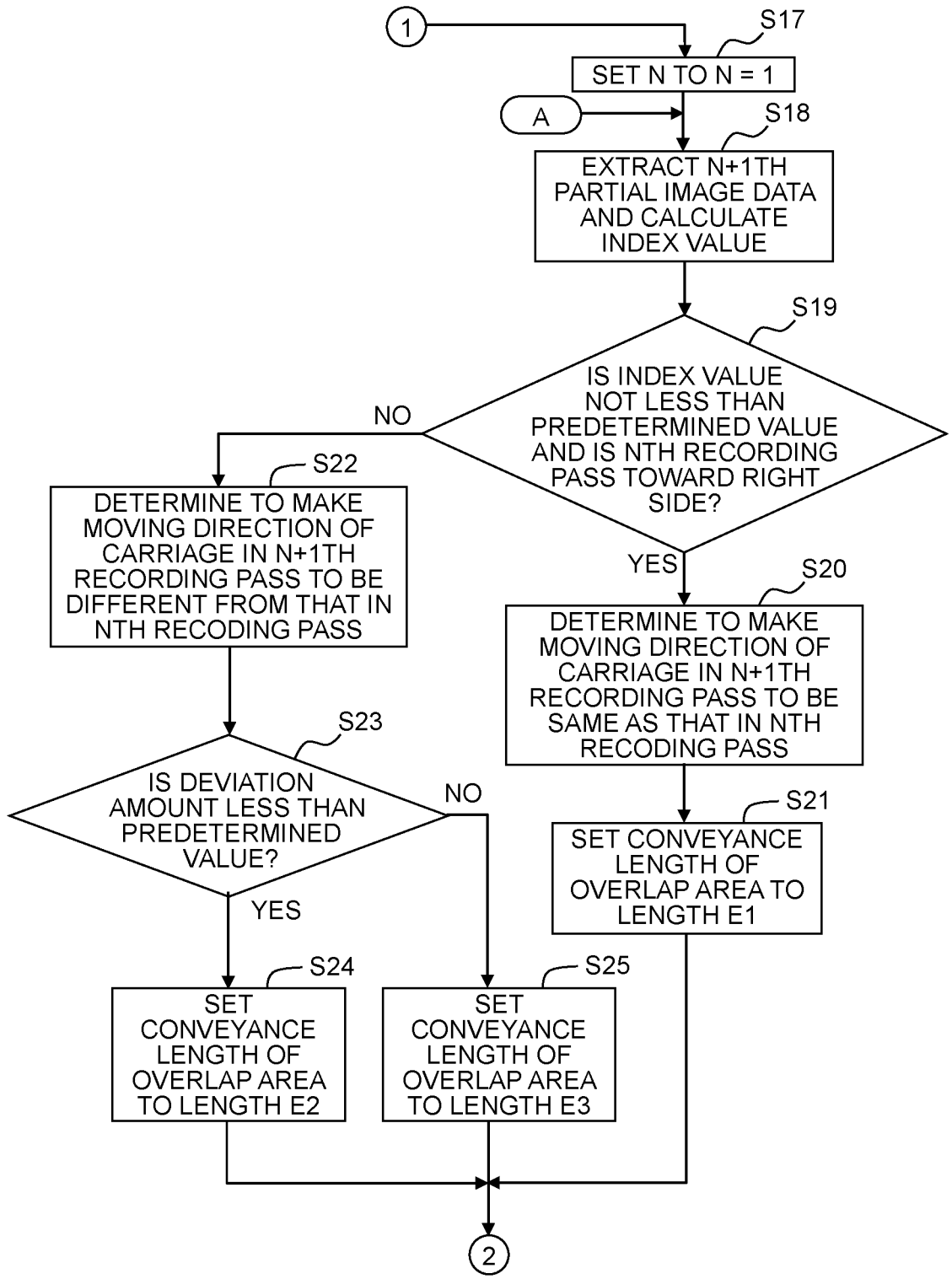
Figure 9C:
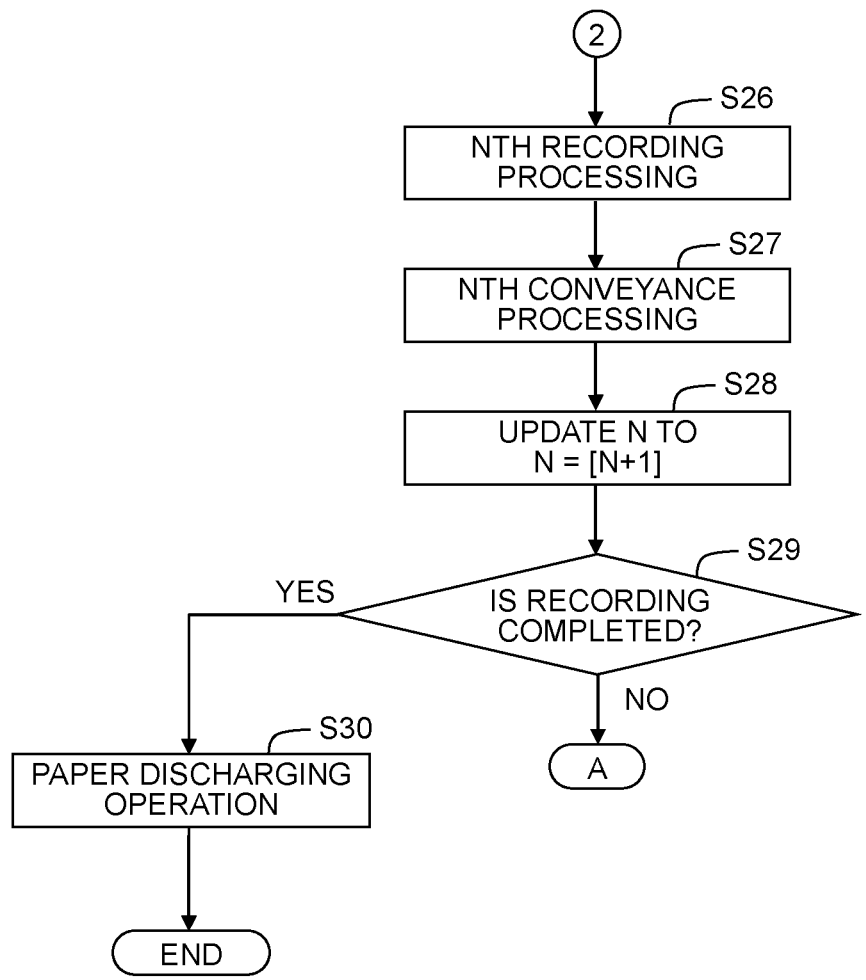

To provide a more specific explanation, the controller 50 determines as to which one of the main tray 31a and the manual feed tray 35 is made to be a supply source of the recording paper sheet P (step S1), as depicted in FIGS. 9A to 9C. In the processing of S1, for example, the controller 50 makes the above-mentioned determination based on a signal which indicates the tray made to be the supply source and which is inputted together with the recording instruction. In a case that the main tray 31a is made to be the supply source (step S1: YES), the controller 50 controls the sheet feeding motor 33 and the conveying motor 57 so as to execute a feeding processing of supplying the recording paper sheet P from the main tray 31a to the recording part 2 (step S2). On the other hand, in a case that the manual feed tray 35 is made to be the supply source (step S1: NO), the controller 50 controls the conveying motor 57 to execute a feeding processing of supplying the recording paper sheet P from the manual feed tray 35 to the recording part 2 (step S3). In the processing of step S2 and the processing of step S3, the recording paper sheet P is supplied up to a position at which a first recording pass is performed (the recording pass is performed for the first time).

After the processing in step S2 or the processing in step S3, the controller 50 determines as to whether or not the recording mode for recording the image is the unidirectional recording mode (step S4). In the processing of S4, for example, the controller 50 makes the above-mentioned determination based on a signal which instructs the recording mode for recording the image and which is inputted together with the recording instruction. In a case that the controller 50 determines that the recording is to be performed in the unidirectional recording mode (step S4: YES), the controller 50 sets the conveyance length E of each of the overlap areas F at the time of the recording the image to the length E1 (step S5), and proceeds to a processing of step S11.

On the other hand, in the processing of S4, in a case that the controller 50 determines to perform the recording not in the unidirectional recording mode (step S4: NO), the controller 50 obtains the above-described deviation-related information (step S6). Afterwards, the controller 50 determines as to the image is to be recorded in which one of the bidirectional recording mode and the partial unidirectional recording mode (step S7). In a case that the controller 50 determines that the recording is to be performed in the bidirectional recording mode (step S7: YES), the controller 50 determines whether or not the amount of deviation in the landing positions of the ink in the scanning direction is less than the predetermined amount, based on the deviation-related information obtained in the processing of step S6 (step S8). In a case that the controller 50 determines that the amount of deviation is less than the predetermined amount (step S8: YES), the controller 50 sets the conveyance length E of the overlap areas F at the time of recording the image to be the length E2 (step S9), and then proceeds to the processing of step S11. On the other hand, in a case that the controller 50 determines that the amount of deviation is not less than the predetermined amount (step S8: NO), the controller 50 sets the conveyance length E of the overlap areas F at the time of recording the image to be the length E3 (step S10), and then proceeds to the processing of step S11.

In the processing of S11, the controller 50 sets a variables N to 1 (one). Afterwards, the controller 50 executes an Nth recording processing (the recording processing performed as the Nth recording processing) (step S12). In the recording processing, the controller 50 controls the carriage motor 56 and the ink-jet head 12 so as to perform the Nth recording pass, thereby recording the image in the recording area $K_N$. Note that in mask data used in a recording pass of which ordinal number is 2nd and a recording pass(es) thereafter (in which N is not less than 2), as a data part corresponding to an overlap area $F_{N-1}$ between the Nth recording pass and a N−1th recording pass, data corresponding to a conveyance length E set with respect to the overlap area F is used therefor. Similarly, in mask data used in a recording pass which is different from the last recording pass, as a data part corresponding to an overlap area $F_N$ between the Nth recording pass and a N+1th recording pass, data corresponding to a conveyance length E set with respect to the overlap area F is used therefor.

Afterwards, the controller 50 executes an Nth conveying operation (step S13). In this conveyance processing, the controller 50 controls the conveying motor 57 so as to cause the conveying roller pair 13 and the discharge roller pairs 16 to perform a conveying operation of conveying the recording paper sheet P only by a predetermined conveyance amount. Here, the predetermined conveyance amount is an amount corresponding to a length [Ln−E] which is shorter, only by the conveyance length E set with respect to the overlap area F, than the length Ln in the conveyance direction of the nozzle row 9.

Next, the controller 50 updates the variable N to [N+1] (step S14). Then, in a case that the recording of the image on the recording paper sheet P is completed (step S15: YES), the controller 50 controls the conveying motor 57 so as to perform a paper discharging operation of discharging the recording paper sheet P to the paper discharge tray 31b by the conveying roller pair 13 and the discharge roller pairs 16 (step S16), and ends this processing. On the other hand, in a case that the recording of the images on the recording paper sheet P is not completed (step S15: NO), the process returns to the processing of S12.

In a case that the controller 50 determines, in the processing of step S7, that the recording is to be performed in the partial unidirectional recording mode (step S7: NO), the controller 50 sets the variable N to 1 (step S17). Afterwards, the controller 50 extracts partial image data corresponding to a (N+1)th the recording pass from the image data, and calculates the index value based on the extracted partial image data (step S18). Then, in a case that the calculated index value is not less than a predetermined value and that the moving direction of the carriage 11 in the Nth recording pass is toward the right side (step S19: YES), the controller 50 determines that the moving direction of the carriage 11 in the (N+1)th the recording pass to be same as the moving direction of the carriage 11 in the Nth recording pass (step S20). Then, the controller 50 sets the conveyance length E of the overlap area $F_N$ of the recording area $K_N$ and the recording area $K_{N+1}$ to be the length E1 (step S21), and proceeds to a processing of step S26.

On the other hand, in a case that the calculated index value is less than the predetermined value or in a case that the moving direction of the carriage 11 in the Nth recording pass is toward the left side (step S19: NO), the controller 50 determines that the moving direction of the carriage 11 in the (N+1)th recording pass is made to be different from the moving direction of the carriage 11 in the Nth the recording pass (step S22). Then, the controller 50 determines whether or not the amount of deviation in the landing positions of the ink in the scanning direction is less than the predetermined amount, based on the deviation-related information acquired in the processing of step S6 (step S23). In a case that the controller 50 determines that the amount of deviation is less than the predetermined amount (S23: YES), the controller 50 sets the conveyance length E of the overlap area $F_N$ to the length E2 (step S24), and proceeds to the processing of step S26. On the other hand, in a case that the controller 50 determines that the amount of deviation is not less than the predetermined amount (step S23: NO), the controller 50 sets the conveyance length E of the overlap area $F_N$ to the length E3 (step S25), and proceeds to the processing of step S26.

In the processing of step S26, the controller 50 executes an Nth recording processing which is similar to that in the processing of step S12. Note, however, that in mask data used in a recording pass of which ordinal number is 2nd and a recording pass(es) thereafter (in which N is not less than 2), as a data part corresponding to an overlap area $F_{N-1}$ between the Nth recording pass and a N−1th recording pass, data corresponding to a conveyance length E set with respect to the overlap area $F_{N-1}$ is used therefor. Similarly, in mask data used in a recording pass which is different from the last recording pass, as a data part corresponding to an overlap area $F_N$ between the Nth recording pass and a N+1th recording pass, data corresponding to a conveyance length E set with respect to the overlap area $F_N$ is used therefor.

Next, the controller 50 executes an Nth conveyance processing which is similar to that in the processing in step S13 (step S27). Note, however, that the predetermined conveyance amount in this conveyance processing is an amount corresponding to a length [Ln−E] which is shorter, only by the conveyance length E set with respect to the overlap area $F_N$, than the length Ln in the conveyance direction of the nozzle row 9.

Afterwards, the controller 50 executes processings of steps S28 to S30 which are similar to the processings of S14 to S16. Note that in the processing of step 30, in a case that the recording of the image on the recording paper sheet P is not completed (step S30: NO), the controller 50 returns to the processing of step S18.

As described above, according to the present embodiment, in a case that the moving direction of the carriage 11 in one of the two continuous recording passes is same as the moving direction of the carriage 11 in the other of the two continuous recording passes, the conveyance length E of the overlap area $F_N$ is set to the length E1 which is the longest. As a result, it is possible to suppress, in a more ensured manner, the occurrence of a streak-shaped unevenness in density along the scanning direction on the recording paper sheet P. On the other hand, in a case that the moving direction of the carriage 11 in one of the two continuous recording passes is different from the moving direction of the carriage 11 in the other of the two continuous recording passes, the conveyance length E of the overlap area F is set to be either one of the length E2 and the length E3 which are shorter than the length E1. With this, it is possible to make any degradation in the image quality, occurring on the overlap area F on the recording paper sheet P due to the deviation in the landing positions of the ink in the scanning direction between the recording passes, to be less conspicuous.

In addition, in a case that the moving direction of the carriage 11 in one of the two continuous recording passes is different from the moving direction of the carriage 11 in the other of the two continuous recording passes, and that the amount of deviation in the landing positions of the ink in the scanning direction between the two continuous recording passes is not less than the predetermined amount, the conveyance length E of the overlap area F is set to be the length E3 which is shorter than the length E2. As a result, it is possible to make the degradation in the image quality, occurring on the overlap area F due to the deviation in the landing positions of the ink in the scanning direction between the two continuous recording passes, to be less conspicuous.

Further, in the present embodiment, the reference mask data U in the case that the conveyance length E of the overlap area F is [Ln/2] is stored. Then, the mask data part of the overlap area F is determined by using a part of the reference mask data U in accordance with the actual length in the conveyance direction, of the overlap area F, which is shorter than the length [Ln/2]. Thus, by storing only one type of reference mask data, it is possible to record thinned-out images in the overlap area F using different mask data in accordance with the actual conveyance length E of the overlap area F.

In the foregoing, the embodiment of the present disclosure has been explained. The present disclosure, however, is not limited to or restricted by the above-described embodiment; a various kinds of changes can be made to the present disclosure within the range described in the claims.

For example, in the above-mentioned embodiment, in the case that the moving direction of the carriage 11 in one of the two continuous recording passes is different from the moving direction of the carriage 11 in the other of the two continuous recording passes, the conveyance length E of the overlap area F is changed depending on (in accordance with) the deviating amount of the landing positions of the ink in the scanning direction between the two continuous recording passes. The present disclosure, however, is not limited to or restricted by this. For example, it is allowable to change the conveyance length E of the overlap area F depending on the tray as the supply source of the recording paper sheet P, as indicated by a first modification as described in the following. In addition, it is allowable to change the conveyance length E of the overlap area F between a case that the recording paper sheet P is nipped by both of the conveying roller pair 13 and the discharge roller pairs 16 and another case that the recording paper sheet P is nipped to only one of the conveying roller pair 13 and the discharge roller pairs 16, as indicated by a second modification below. Hereinafter, the first modification and the second modification will be explained in detail.

Figure 10A:
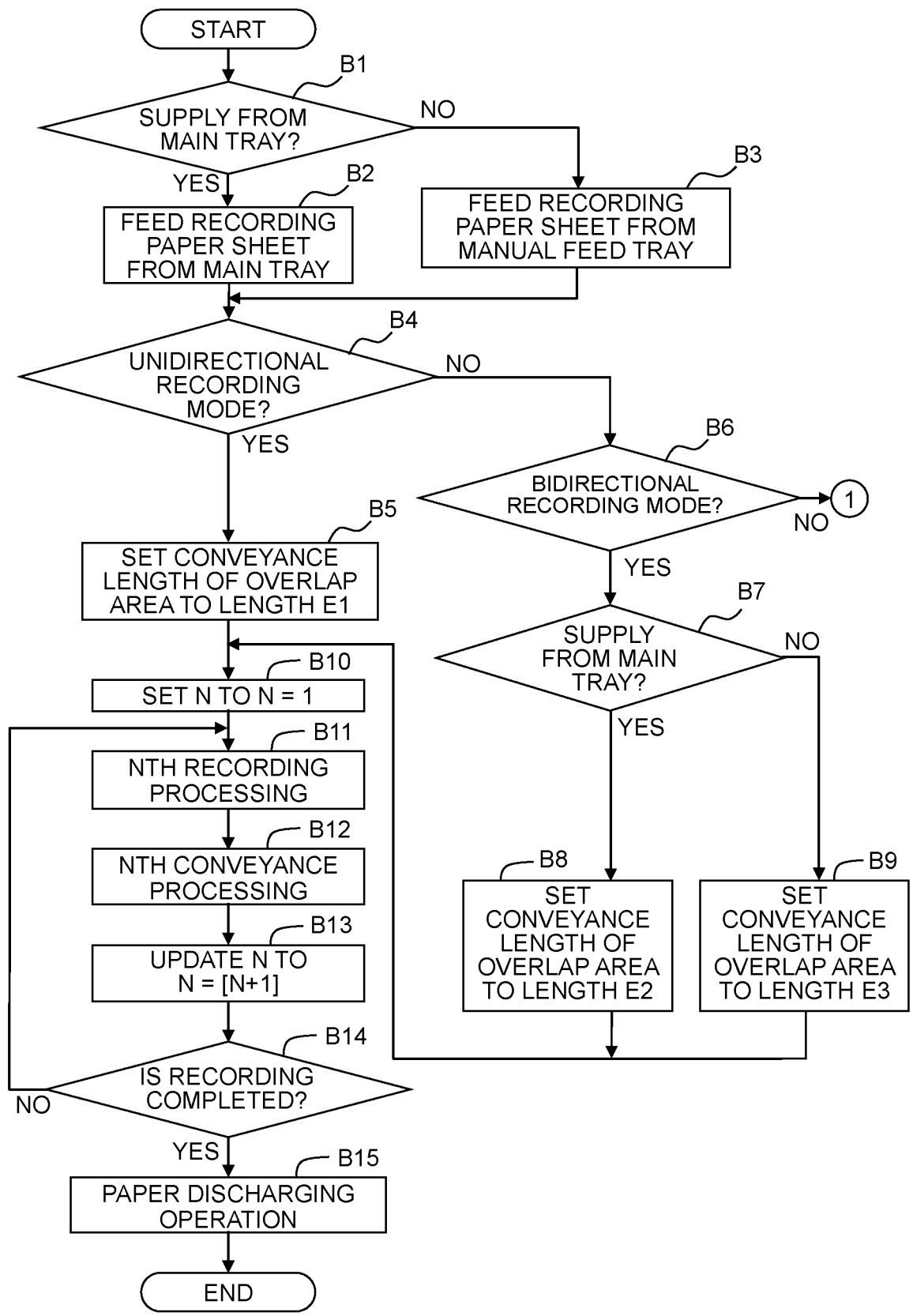
FIGS. 10A, 10B and 10C depict a flowchart indicating the flow of a processing in a case of preforming recording in accordance with a first modification.
Figure 10B:
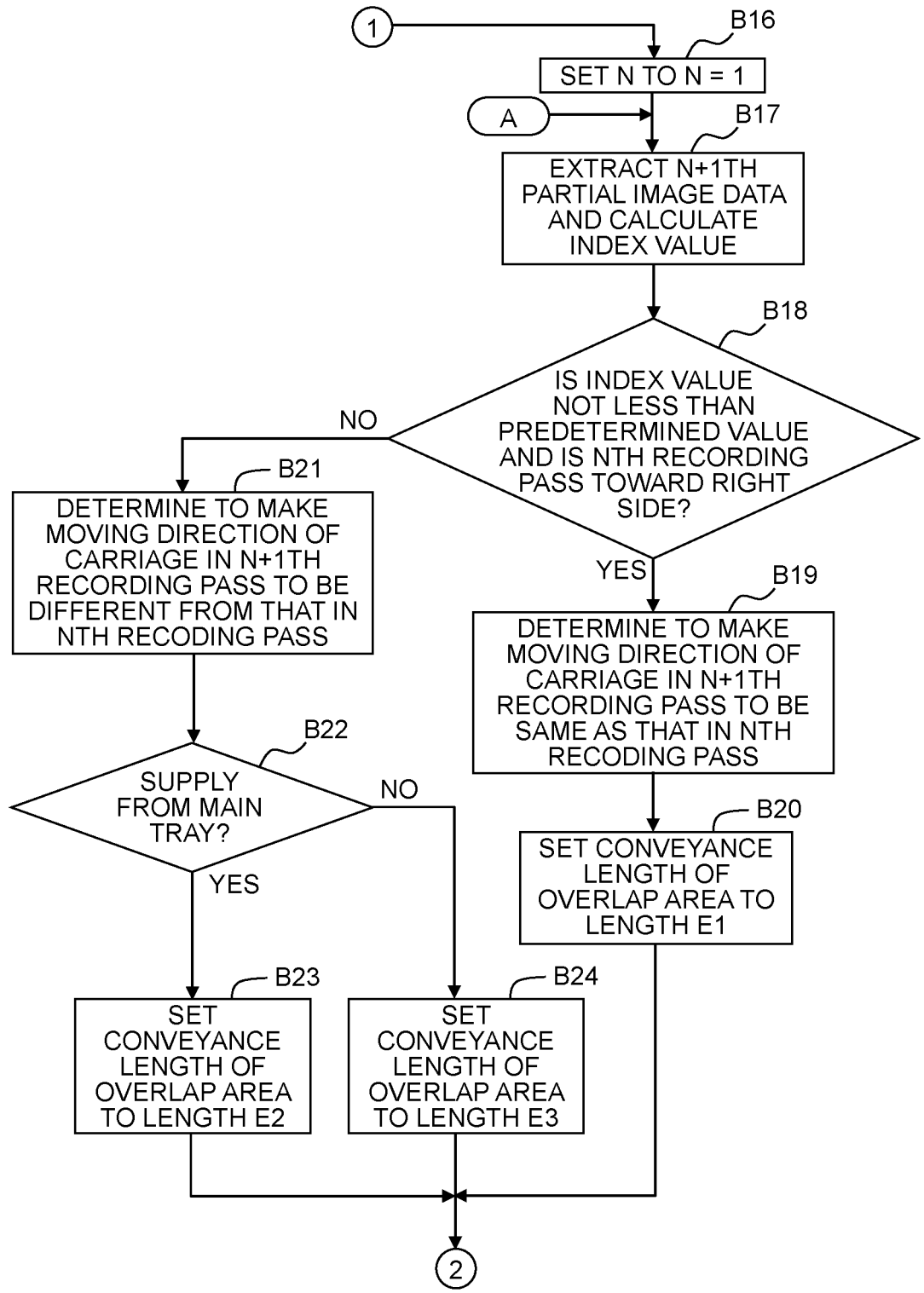
Figure 10C:
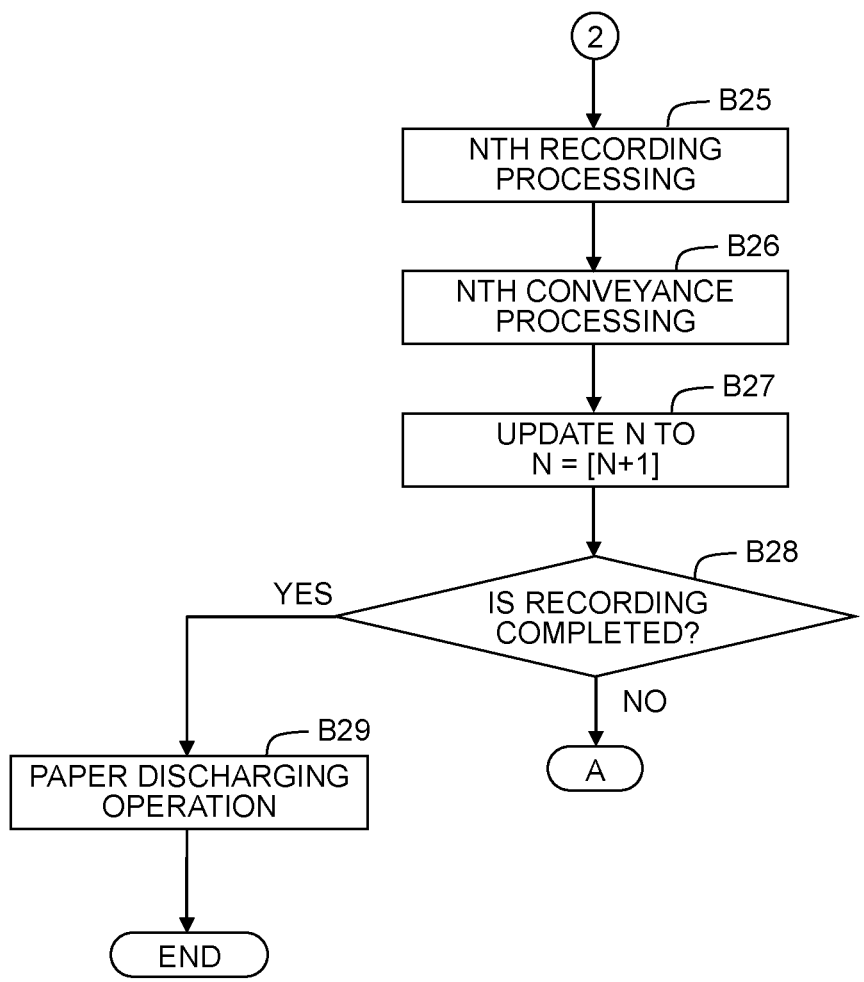
Figure 11A:
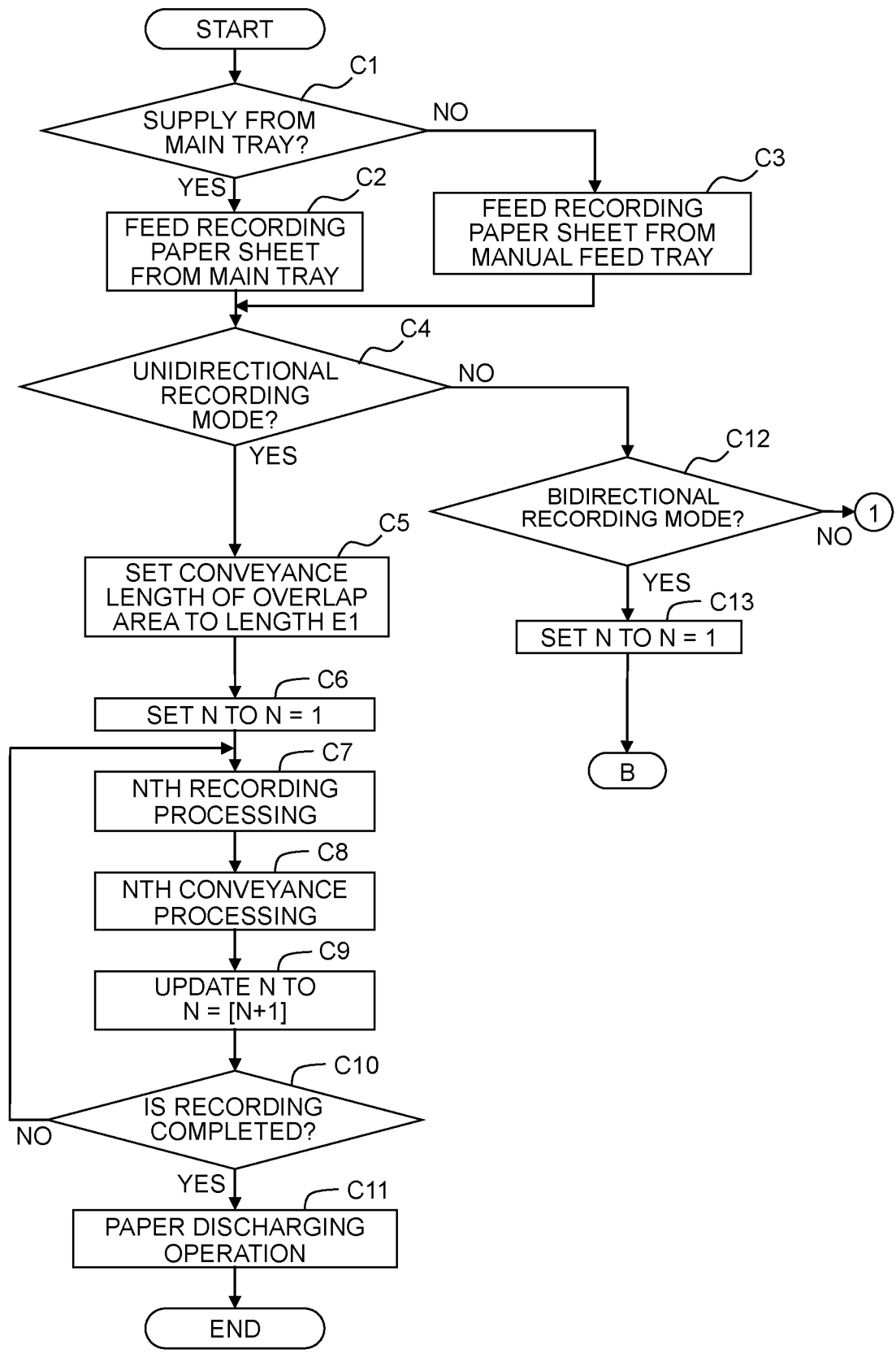
FIGS. 11A, 11B, 11C and 11D depict a flowchart indicating the flow of a processing in a case of preforming recording in accordance with a second modification.
Figure 11B:
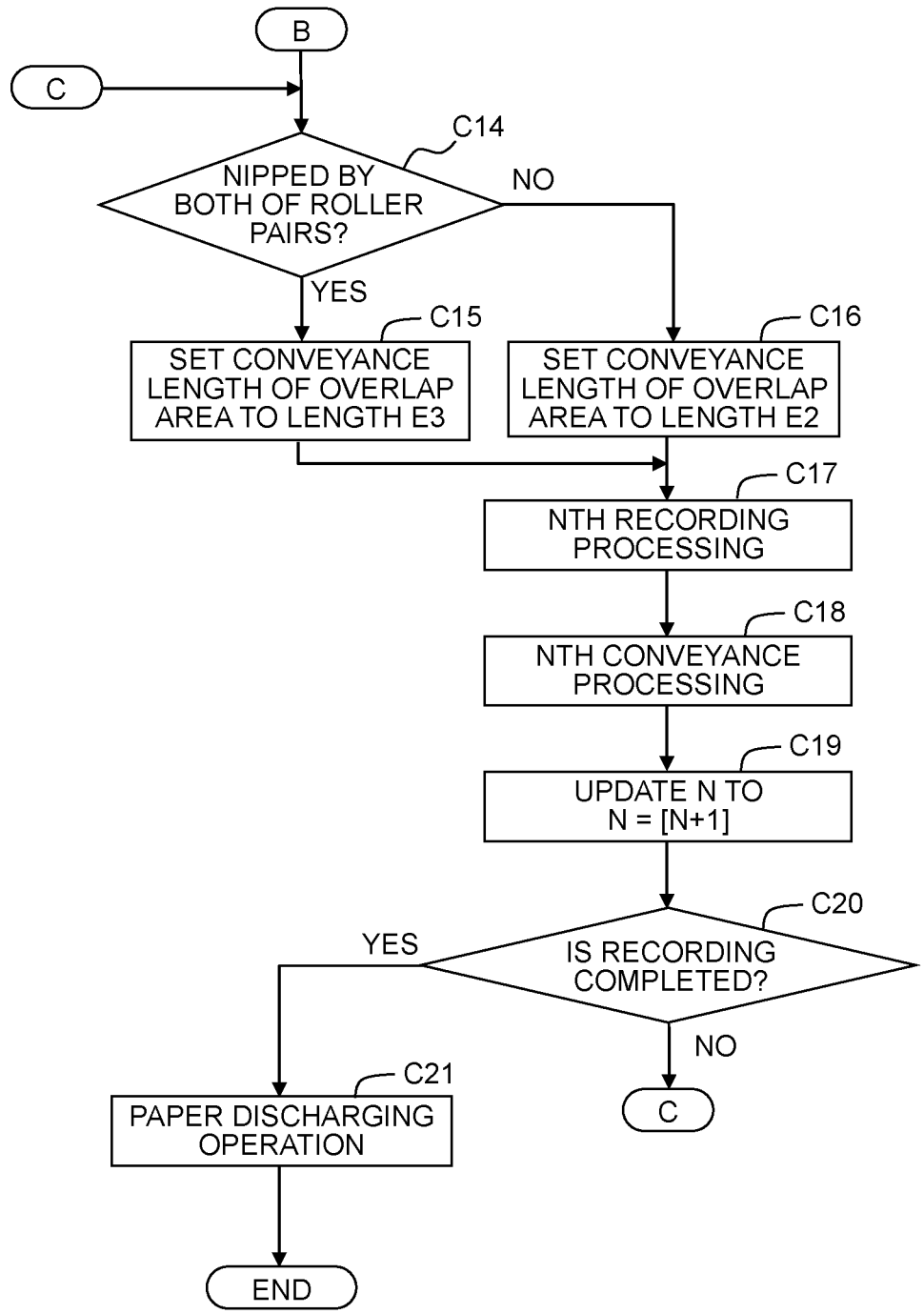
Figure 11C:
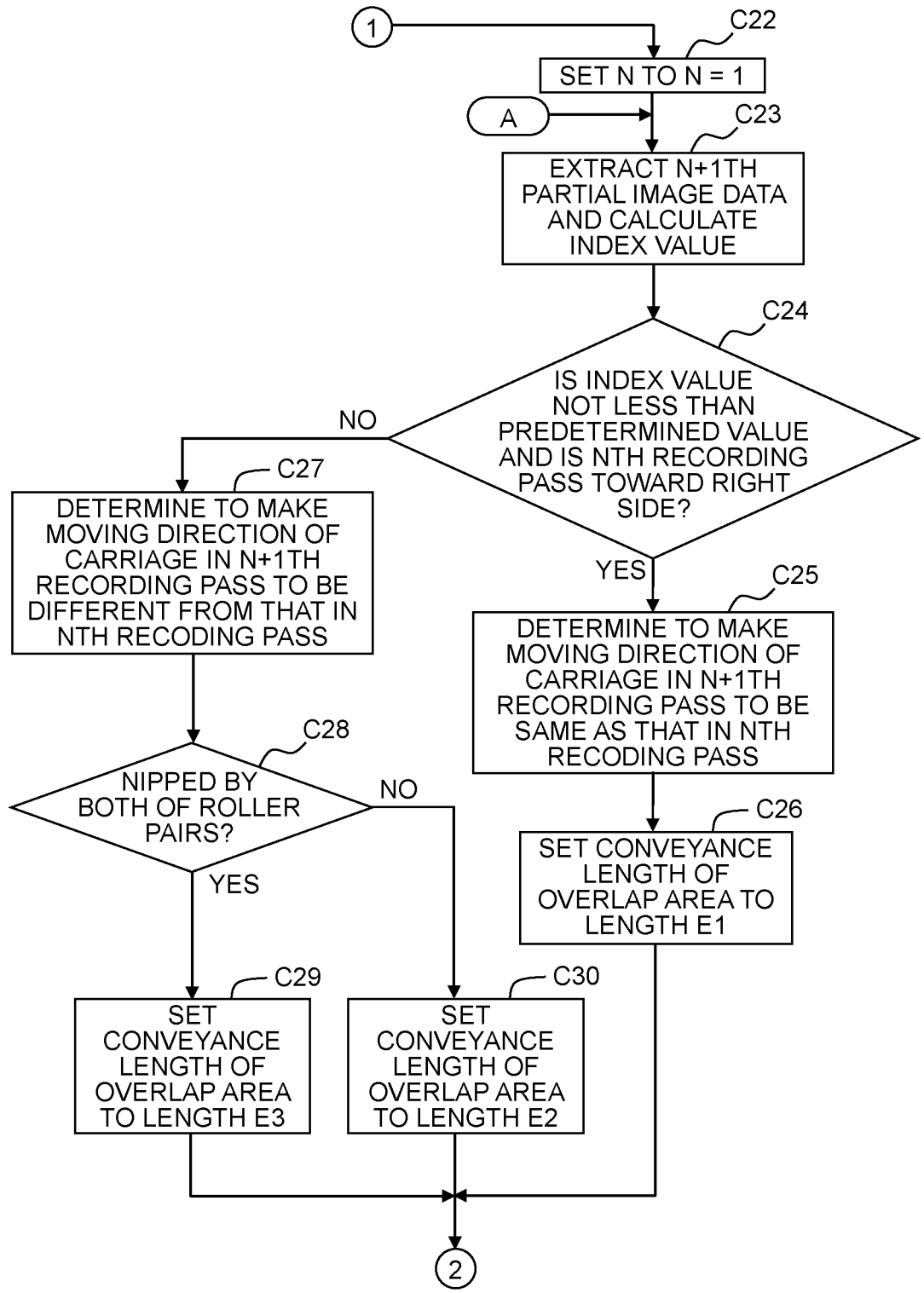
Figure 11D:
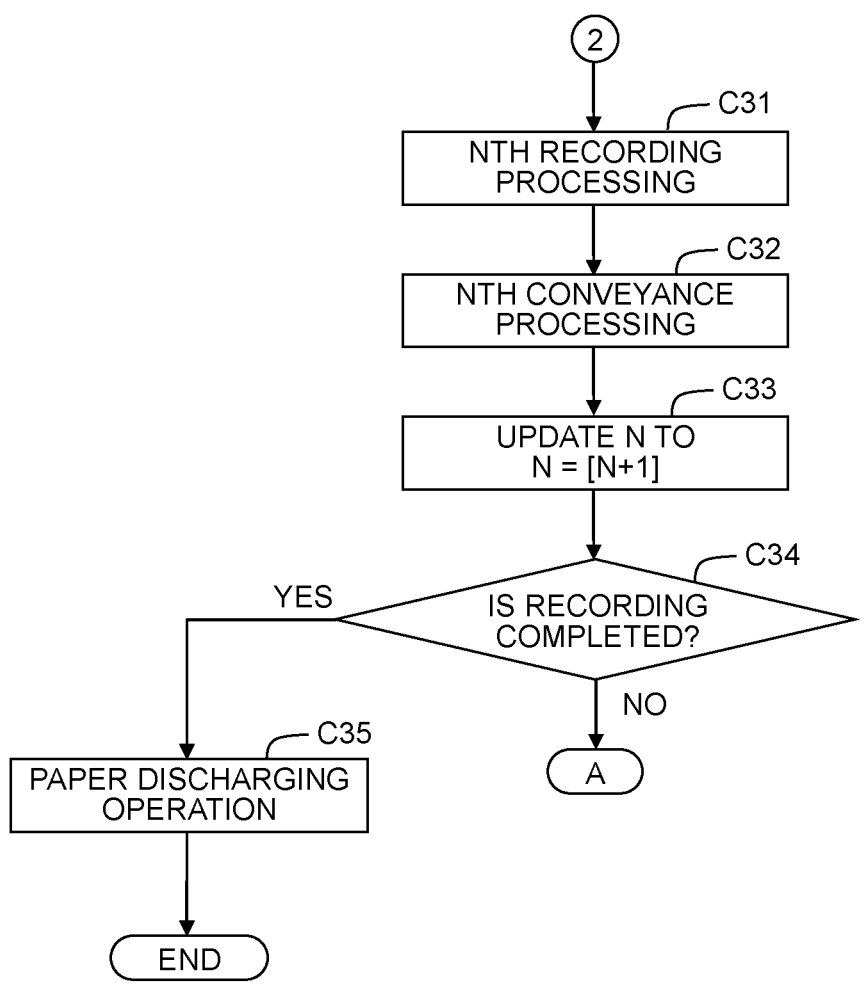

In the first modification, as depicted in FIGS. 10A to 10C, the controller 50 performs processings of steps B1 to B5 which are similar to the processings steps S1 to S5. Further, in a case that the controller 50 determines in the processing of step B4 that the recording is to be performed not in the unidirectional recording mode (step B4: NO), the controller 50 determines as to the image is to be recorded in which one of the bidirectional recording mode and the partial unidirectional recording mode (step B6). In a case that the controller 50 determines that recording is to be performed in the bidirectional recording mode (step B6: YES), the controller 50 determines as to the supply source of the recording paper sheet P is which one of the main tray 31a and the manual feed tray 35 (step B7). In a case that the controller 50 determines that the supply source is the main tray 31a (step B7: YES), the controller 50 sets the conveyance length E of the overlap area F to be the length E2 (step B8). On the other hand, in a case that the controller 50 determines that the supply source is the manual feed tray 35 (step B7: NO), the controller 50 sets the conveyance length E of the overlap area F to be the length E3 (step B9). Afterwards, the controller 50 executes processings of steps B10 to B15 which are similar to the processings of S11 to S16.

On the other hand, in a case that the controller 50 determines in the processing of step B6 that recording is to be performed in the partial unidirectional recording mode (step B6: NO), the controller 50 executes processings of steps B16 to B21 which are similar to the processings of steps S17 to S22. Then, after the processing of B21, the controller 50 determines as to the supply source of the recording paper sheet P is which one of the main tray 31a and the manual feed tray 35 (step B22). In a case that the controller 50 determines that the supply source is the main tray 31a (step B22: YES), the controller 50 sets the conveyance length E of the overlap area $F_N$ to be the length E2 (step B23). On the other hand, in a case that the controller 50 determines that the supply source is the manual feed tray 35 (step B22: NO), the controller 50 sets the conveyance length E of the overlap area $F_N$ to be the length E3 (B24). Afterwards, the controller 50 executes processings of steps B25 to B29 similar to the processings of steps S26 to S30.

As described above, in the first modification, in the case that the moving direction of the carriage 11 in one of the two continuous recording passes is different from the moving direction of the carriage 11 in the other of the two continuous recording passes, and that the supply source of the recording paper sheet P is the main tray 31a, the conveyance length E of the overlap area $F_N$ is set to be the length E2 which is longer than the length E3 which is set in the case that the supply source of the recording paper sheet P is the manual feed tray 35.

Here, in a case that the recording paper sheet P is supplied from the main tray 31a to the recording part 2, the recording paper sheet P is supplied along the supply passage R1 which is substantially C-shaped. In a case that the recording paper sheet P is supplied along the supply passage R1, curl or curling occurs in the recording paper sheet P. On the other hand, in a case that the recording paper sheet P is supplied from the manual feed tray 35 to the recording part 2, the recording paper sheet P is supplied along the supply passage R2 which is substantially linear. Therefore, the curling is less likely to occur in the recording paper sheet P in the case that the recording paper sheet P is supplied along the supply passage R2. Accordingly, in a case that an image is recorded by the recording part 2, the recording paper sheet P supplied from the main tray 31a is in a curled state as compared with the recording paper sheet P supplied from the manual feed tray 35. In a case of conveying a recording paper sheet P which is curled in such a manner, any variation or unevenness is likely to occur in the conveyance amount, due to which any unevenness in the density along the scanning direction might be easily occur at a boundary part between recording areas K which are recorded by two continuous recording passes, respectively. In view of this situation, in the first modification, in a case that the recording paper sheet P is supplied from the main tray 31a, the conveyance length E of the overlap area F is made to be longer than in a case that the recording paper sheet P is supplied from the manual feed tray 35. With this, it is possible to suppress, in a more ensure manner, the occurrence of the unevenness in density along the scanning direction on the recording paper sheet P. In the first modification, the supply passage, via which the recording paper sheet P is supplied, corresponds to the "predetermined condition" of the present disclosure.

Note that in the first modification, it is allowable that the printer 1 is provided further with a reverse passage starting from a part, of the recording part 2, on the downstream side in the conveyance direction and arriving at another part, of the recording part 2, on the upstream side in the conveyance direction; and that the printer 1 is configured be capable of performing recording an image or images on the both sides of the recording paper sheet P by switching back the recording paper sheet P having an image recorded thereon by the recording part 2 and then by supplying the recording paper sheet P again to the recording part 2 along the reverse passage. In this case, in a case that the recording paper sheet P is supplied to the recording part 2 along the reverse passage, the curling occurs in a similar manner as in the case that the recording paper sheet P is supplied to the recording part 2 along the supply passage R1. Therefore, in a case that the recording paper sheet P is supplied to the recording part 2 along the reverse passage, the conveyance length E of the overlap area F may be made long as compared with a case that the recording paper sheet P is supplied from the manual feed tray 35. In this case, this reverse passage corresponds to the "first supply passage" of the present disclosure.

Next, a second modification will be explained. In the second modification, as depicted in FIGS. 11A to 11D, the controller 50 performs processings of steps C1 to C5 which are similar to the processings of S1 to S5. After the processing of step C5, the controller 50 performs processings of steps C6 to C11 which are similar to the processings of steps S11 to S16. Further, in the processing of step C4, in a case that the controller 50 determines that recording is performed not in the unidirectional recording mode (step C4: NO), the controller 50 determines as to the image is to be recorded in which one of the bidirectional recording mode and the partial unidirectional recording mode (step C12). In a case that the controller 50 determines that recording is to be performed in the bidirectional recording mode (step C12: YES), the controller 50 sets a variables N to 1 (one) (step C13). Afterwards, the controller 50 determines whether the recording paper sheet P is nipped by both of the conveying roller pair 13 and the discharge roller pairs 16 as depicted in FIG. 4B, or by only one of the conveying roller pair 13 and the discharge roller pairs 16 as depicted in FIG. 4A (step C14)

Figure 4A:
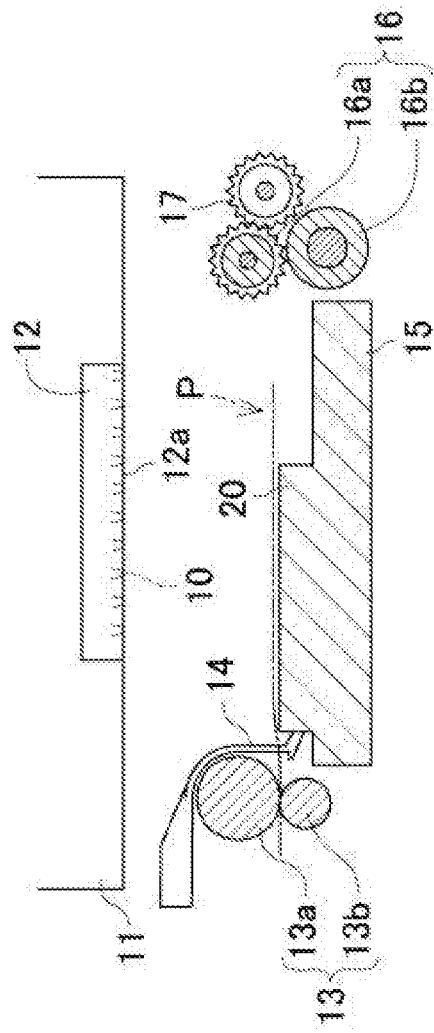
FIG. 4A is a cross-sectional view taken along a line IVA-IVA in FIG. 2.
Figure 4B:
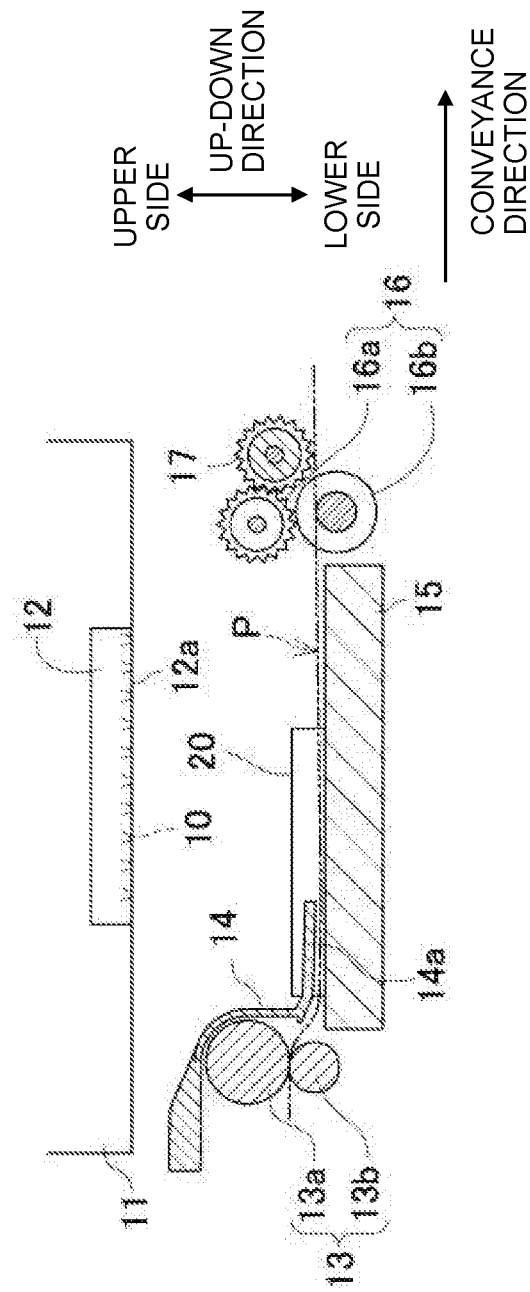
FIG. 4B is a cross-sectional view taken along a line IVB-IVB in FIG. 2.

Here, in a case that the recording is performed by the recording part 2, and that a first recording pass is performed (recording pass performed as the first recording pass), the recording paper sheet P is in a state that the recording paper sheet P is nipped only by the conveying roller pair 13 among the conveying roller pair 13 and the discharge roller pairs 16, as depicted in FIG. 4A. Afterwards, the recording paper sheet P is conveyed by at least one time of the conveying operation so that the recording paper sheet P is in a state that the recording paper sheet P is nipped by both of the conveying roller pair 13 and the discharge roller pairs 16, as depicted in FIG. 4B. Further, afterwards, the recording paper sheet P is conveyed by at least one time of the conveying operation so that the recording paper sheet P is in a state that the recording paper sheet P is nipped only by the discharge roller pairs 16 among the conveying roller pair 13 and the discharge roller pairs 16. It is possible to determine as to the recording paper sheet P is in which one of the above-described three states by, for example, the size of the recording paper sheet P (length thereof in the conveyance direction) and the ordinal number of the recording pass performed.

In a case that the controller 50 determines that the recording paper sheet P is nipped by both of the conveying roller pair 13 and the discharge roller pairs 16 (step C14: YES), the controller 50 sets the conveyance length E of the overlap area $F_N$ to the length E3 (step C15), and then the controller 50 proceeds to the processing of step C17. On the other hand, in a case that the controller 50 determines that the recording paper sheet P is nipped by only one of the conveying roller pair 13 and the discharge roller pairs 16 (step C14: NO), the controller 5 sets the conveyance length E of the overlap area $F_N$ to the length E2 (C15), and then the controller 50 proceeds to the processing of step C17. Afterwards, the controller 50 executes the processings of steps C17 to C21 which are similar to the processings of steps S26 to S30. Note that in processing of step C20, in a case that the recording of the image on the recording paper sheet P is not completed (step C20: NO), the controller 50 returns to the processing of step C14.

In a case that the controller 50 determines in the processing of C12 that the recording is to be performed in the partial unidirectional recording mode (step C12: NO), the controller 50 executes processings of C22 to C27 which are similar to the processings of S17 to S22. Then, after processing of C27, the controller 50 executes the processings of C28 to C30 which are similar to the processings of steps C14 to C16 as described above. Afterwards, the controller 50 executes the processings of steps C31 to C35 which are similar to the processings of steps S26 to S30.

As described above, in the second modification, in a case that the moving direction of the carriage in one of the two continuous recording passes is different from the moving direction of the carriage in the other of the two continuous recording passes, and that the recording paper sheet P is nipped by only one of the conveying roller pair 13 and the discharge roller pairs 16, the conveyance length E is set to the length E2 which is longer than the length E3 which is set in a case that the recording paper sheet P is nipped by both of the conveying roller pair 13 and the discharge roller pairs 16.

Here, in the state that the recording paper sheet P is nipped by only one of the conveying roller pair 13 and the discharge roller pairs 16, any variation (unevenness) in the conveyance amount is more likely to occur than in a case that the recording paper sheet P is nipped by both of the conveying roller pair 13 and the discharge roller pairs 16, which in turn results in such a situation that any unevenness in the density along the scanning direction is likely to occur at the boundary part between the recording areas K which are recorded by two continuous recording passes, respectively.

In view of the above-described situation, in the second modification, in a case that the recording paper sheet P is nipped by only one of the conveying roller pair 13 and the discharge roller pairs 16 as described above, the conveyance length E of the overlap area F is made longer than in another case that the recording paper sheet P is nipped by both of the conveying roller pair 13 and the discharge roller pairs 16. With this, it is possible to make any unevenness in the density, caused due to the deviation in the landing of the ink in the scanning direction between the recording passes in the overlap area F, be less conspicuous. As a result, it is possible to suppress, in a more ensured manner, the occurrence of the unevenness in density along the scanning direction on the recording paper sheet P. In the second modification, the nip states of the conveying roller pair 13 and the discharge roller pairs 16 in a case that the recording paper sheet P is conveyed corresponds to the "predetermined condition" of the present disclosure.

Figure 12A:
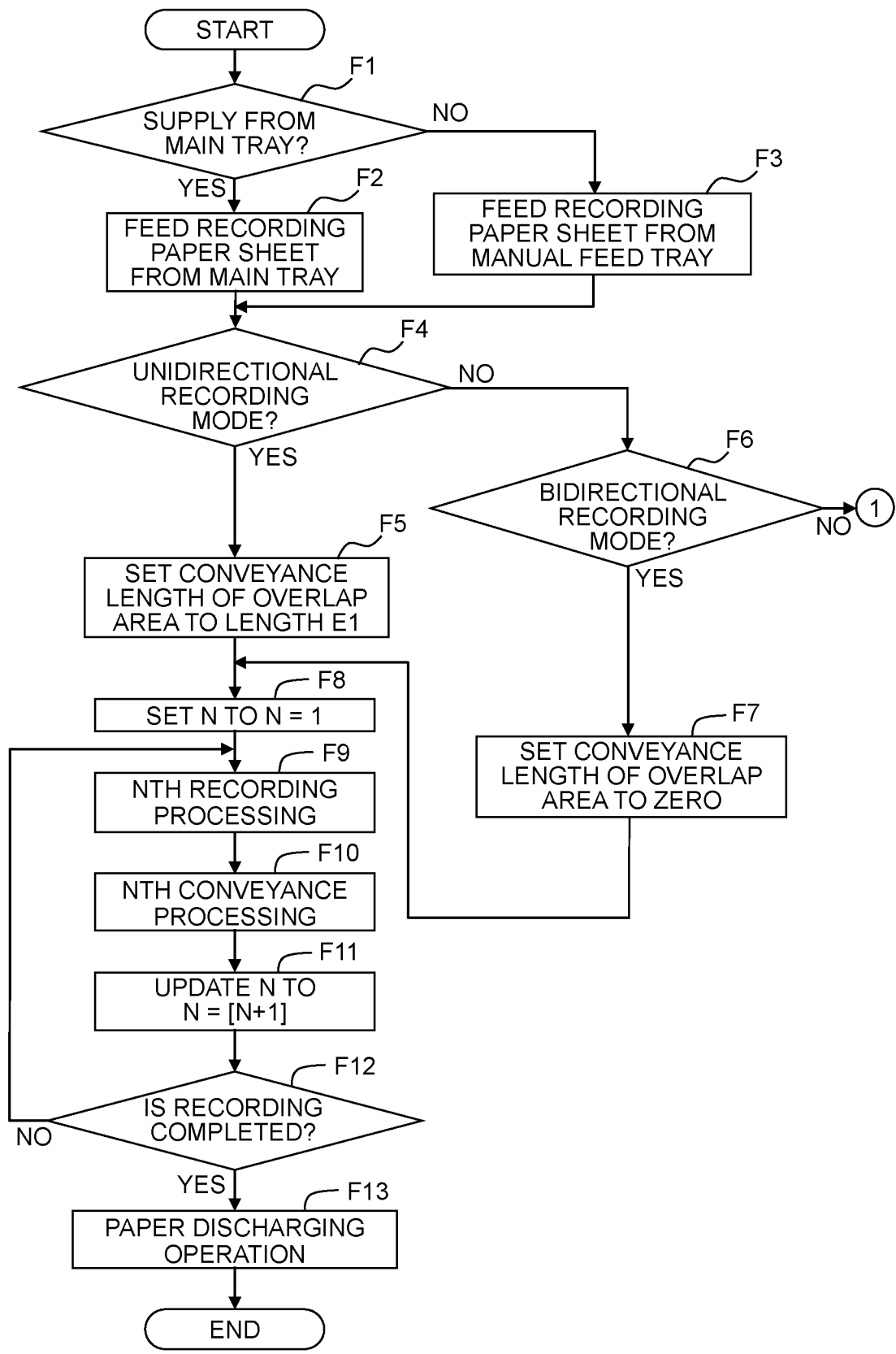
FIGS. 12A, 12B and 12C depict a flowchart indicating the flow of a processing in a case of preforming recording in accordance with a third modification.
Figure 12B:
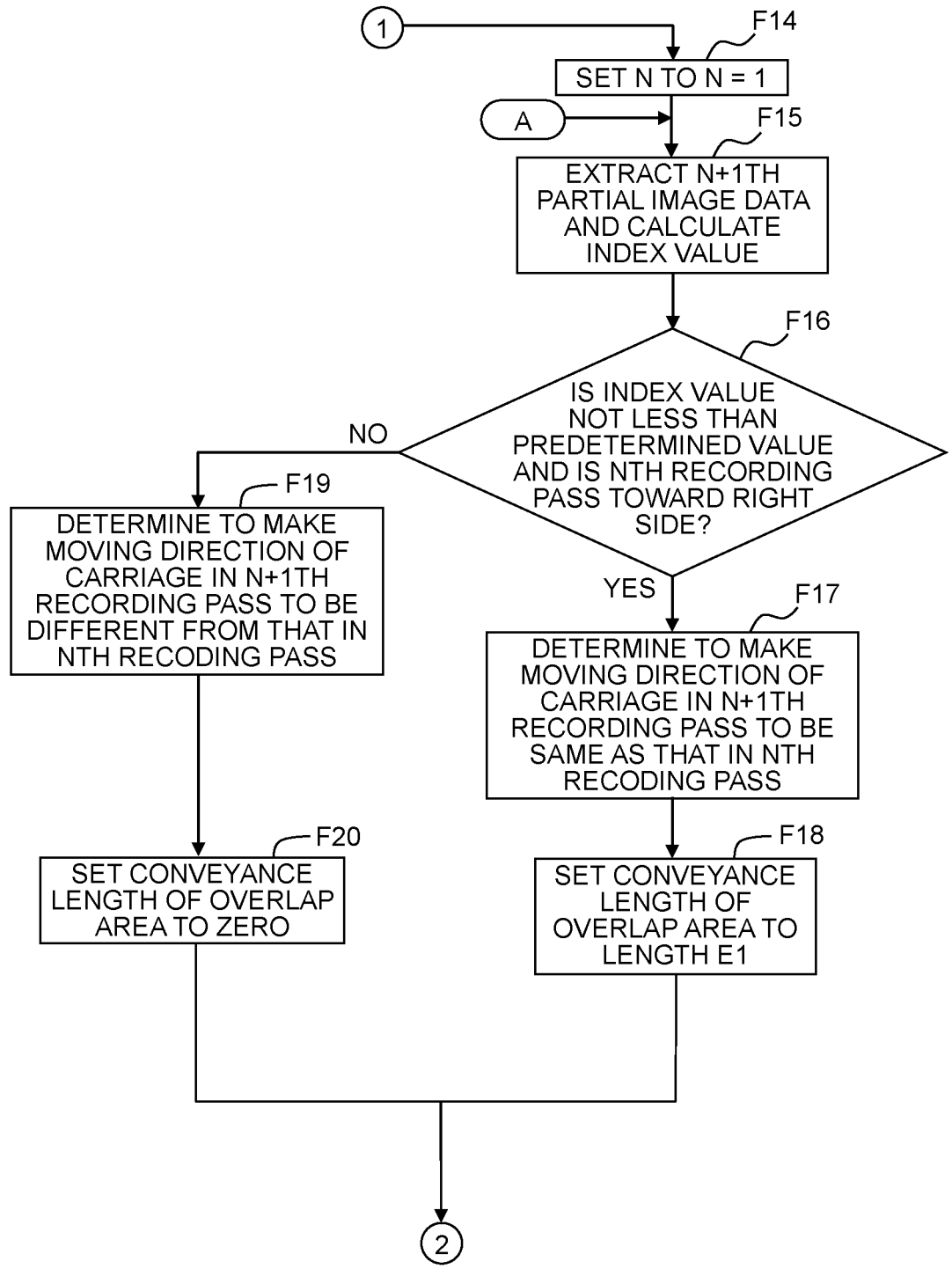
Figure 12C:
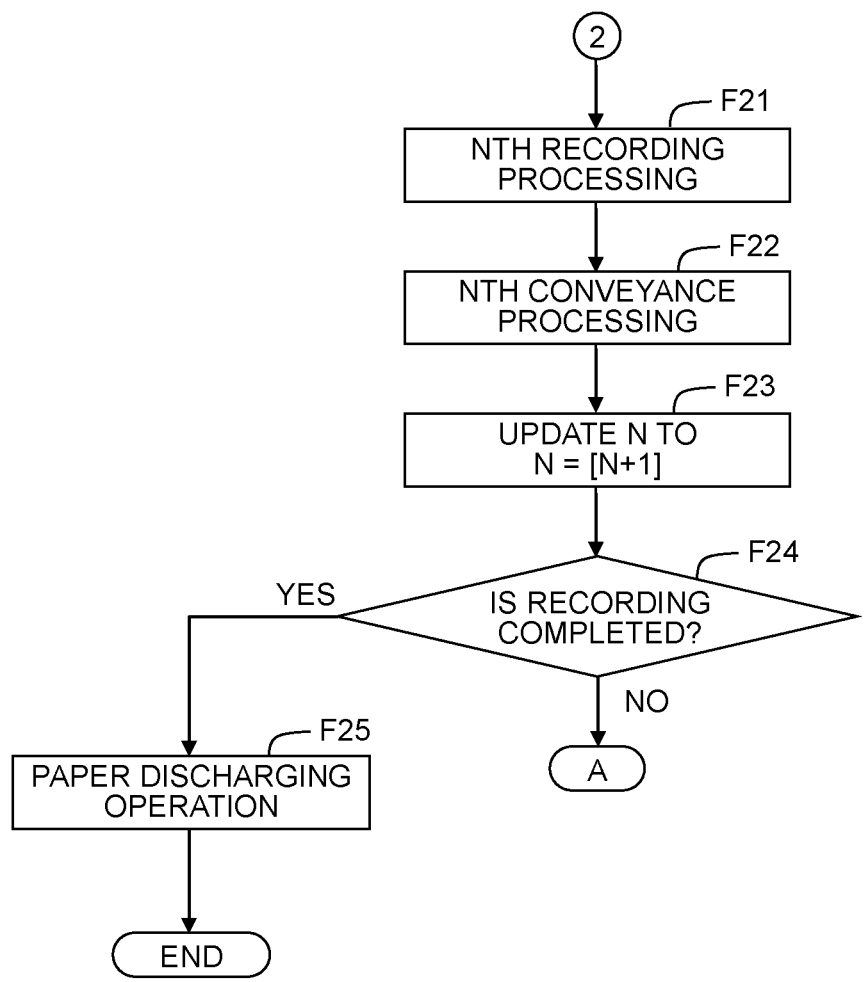

Next, a third modification will be described. In the third modification, in a case that the moving direction of the carriage in one of the two continuous recording passes is different from the moving direction of the carriage in the other of the two continuous recording passes, the recording paper sheet P is conveyed in the conveying operation such that the recording areas K formed by two continuous recording passes do not overlap each other. Specifically, as depicted in FIGS. 12A to 12C, the controller 50 executes processings of μl to F5 which are similar to the processings of S1 to S5. Further, in a case that the controller 50 determines, in processing of step F4, that recording is to be performed not in the unidirectional recording mode (step F4: NO), the controller 50 determines as to the image is to be recorded by which one of the bidirectional recording mode and the partial unidirectional recording mode (step F6). In a case that the controller 50 determines that recording is to be performed in the bidirectional recording mode (step F6: YES), the controller 50 sets the conveyance length E of the overlap area F to zero (0) (step F7), and then proceeds to the processing of step S8. Then, the controller 50 executes processings of F8 to F13 which are similar to the processings of S11 to S16.

On the other hand, in a case that the controller 50 determines, in the processing of step F6, that the recording is to be performed in the partial bidirectional recording mode (step F6: NO), the controller 50 executes processings of F14 to F19 which are similar to the processings of steps S17 to S22. Then, after the processing of F19, the controller 50 sets the conveyance length E of the overlap area $F_N$ to zero (0) (step F20), and proceeds to processing of step F21. Afterwards, the controller 50 executes the processings of F21 to F25 which are similar to the processings of steps S26 to S30.

As described above, in the third modification, the conveyance length E of the overlap area $F_N$ is set to the length E1 in a case that the moving direction of the carriage 11 in one of the two continuous recording passes is the same as the moving direction of the carriage in the other of the two continuous recording passes. As a result, it is possible to suppress the occurrence of the unevenness in density which is streak-shaped along the scanning direction on the recording paper sheet P. On the other hand, in a case that the moving direction of the carriage in one of the two continuous recording passes is different from the moving direction of the carriage in the other of the two continuous recording passes, the conveyance length E of the overlap area F is set to zero (0). With this, it is possible to suppress the degradation in the image quality caused due to the deviation in the landing positions of the ink in the scanning direction between the recording passes on the recording paper sheet P.

In the following, other modifications will be described. In the embodiment described above, the corrugate plates 14 and the corrugated spurs 17 may be omitted. Further, the present disclosure is not limited to or restricted by the configuration wherein the recording paper sheet P is supported by the plurality of supporting parts which are arranged side by side in the scanning direction at spacing distances therebetween. It is allowable to provide such a configuration different from the configuration that the recording paper sheet P is supported by the plurality of supporting parts at a plurality of locations; for example, it is allowable to provide such a configuration that the recording paper sheet P is supported by a planar-shaped platen.

Furthermore, in the above-described embodiment, the reference mask data U is stored, and the mask data part of the overlap area F is determined by using a part of the reference mask data in accordance with the actual length of the overlap area F; the present disclosure, however, is not limited to this. For example, it is allowable to store, individually, a plurality of pieces of mask data (the plurality of pieces of the mask data such as depicted in FIGS. 8A to 8C) for respective lengths in the conveyance direction of the overlap area F.

Further, in the above-described embodiment, the conveyance length E of the overlap area F is changed by changing the conveying amount of the recording paper sheet P in the conveying operation. The present disclosure, however, is not limited to this. For example, it is allowable to change the conveyance length E of the overlap area F by fixing the conveyance amount in each of the conveying operations and then by changing the number of non-used nozzles which are not used for recording the thinned-out image in the recording pass. Specifically, among the plurality of nozzles 10 of the nozzle row 9, a predetermined number of the nozzles 10 from the upstream side in the conveyance direction and a predetermined number of the nozzles 10 from the downstream side in the conveyance direction are set to be the non-used nozzles, respectively. Then, by setting the predetermined number to be smaller as the conveyance length E of the overlap area F which is to be set is longer, thereby making it possible to change the conveyance length E of the overlap area F.

Further, it is also allowable to further change the conveyance length E of the overlap area F, depending on the position in the scanning direction on the recording paper sheet P. For example, in the above-described embodiment, the recording paper sheet P is allowed to have the wave-like or corrugated shape along the scanning direction. In this situation, since the ribs 20 supporting the recording paper sheet P from therebelow are arranged at the positions, respectively, at which the ribs 20 face or are opposite to the ink discharge surface 12a, the position in the up-down direction (distance from the ink discharge surface 12a) of a part, of the recording paper sheet P, facing the ink discharge surface 12a is less likely to vary or fluctuate on the recording paper sheet P at the ridge part with the position Pt as the center thereof. For this reason, the unevenness in density due to the deviation in the landing positions of the ink between the recording passes in the scanning direction is unlikely to occur in the ridge part.

In contrast, it is necessary to arrange each of the pressing parts 14*a* and each of the corrugated spurs 17 to be shifted in the conveyance direction from the position facing the ink discharge surface 12*a*. Therefore, the position in the up-down direction (distance from the ink discharge surface 12*a*) of a part, of the recording paper sheet P, facing the ink discharge surface 12*a* is more likely to vary or fluctuate on the recording paper sheet P at the valley part with the position Pb as the center thereof. For this reason, the unevenness in density due to the deviation in the landing positions of the ink between the recording passes in the scanning direction is likely to occur in the valley part. Accordingly, the conveyance length E of a portion or part of the overlap area F located in the valley part may be shorter than the conveyance length E of a portion or part of the overlap area F located in the ridge part. With this, it is possible to suppress, in an ensured manner, the occurrence of the unevenness in density due to the deviation in the landing positions of the ink in the scanning direction between the recording passes.

Further, the controller 50 determines, based on the image data, whether or not to a discharge dot image, in which discharge dots formed by the ink discharged from the nozzles 10 in an amount greater than zero (0) are arranged continuously side by side in the scanning direction is to be recorded while straddling across the boundary of the recording areas K formed by the two continuous recording passes. Further, in a case that the discharge dot image is not to be recorded across the boundary between the recording areas K, it is allowable that the conveyance length of the overlap area F related to the two times of the recording pass (two continuous recording passes) is made to short as compared with another case that the discharge dot image is to be recorded across the boundary between the recording areas K, or that the conveyance length E of the overlap area F is made to zero (0). In the case that the discharge dots are not to be recorded across the boundary between the recording areas K, the unevenness in density having the streak-like shape does not occur along the scanning direction, even in a case that the unevenness in the conveyance occurs when performing the recording paper sheet P. Therefore, in this case, by shortening the conveyance length E of the overlap area F or by setting the conveyance length E to zero, it is possible to make the deterioration in the image quality which occurs on the overlap area F to be less conspicuous, while improving the throughput.

Furthermore, in the partial unidirectional recording mode, the controller 50 determines whether or not the moving direction of the carriage 11 in the subsequent recording pass is made to be same as or different from the moving direction of the carriage 11 in the preceding recording pass, depending on whether or not an image represented by the partial image data corresponding to the subsequent recording pass is an image in which the color difference caused by the landing order of the inks is likely to be conspicuous; however, the present disclosure is not limited to this. For example, it is allowable to determine, based on image data, whether the moving direction of the carriage 11 in the subsequent recording pass is made to be same as or different from the moving direction of the carriage 11 in the preceding recording pass, depending on whether or not the total discharge amount of the ink discharged in at least one of the two continuous recording passes is not less than a predetermined amount.

Further, in the above-described embodiment, the length settable as the conveyance length E of the overlap area F is of the three kinds which are: the length E1, the length E2, and the length E3; the present disclosure, however, is not limited to this. It is allowable that the length settable as the conveyance length E of the overlap area F is of not less than two kinds of lengths. As the conveyance length E of the overlap area F, in a case that there are two kinds of settable lengths, and that the moving direction of the carriage in one of the two continuous recording passes is different from the moving direction of the carriage in the other of the two continuous recording passes, the conveyance length E which is settable is consequently only one kind of conveyance length.

In the above-mentioned embodiment, although all the four color inks are pigment inks, the present disclosure is not limited to this. For example, it is allowable that only the black ink is a pigment ink, and that the yellow, cyan, and magenta inks are dye inks, respectively. Alternatively, all the four color inks may be dye inks. The ink may be an ultraviolet curable ink (UV curable ink), etc.

Further, in the foregoing description, the explanation has been given about the example wherein the present disclosure is applied to a printer which discharges the ink(s) from the nozzles and records an image on the recording paper sheet P. The present disclosure, however, is not limited to this. The present disclosure may be applied, for example, also to an image recording apparatus which discharges an ink from nozzles with respect to a recording medium which is different from the recording paper sheet P, including, for example, a case of a portable terminal such as a smart phone, a corrugated cardboard, etc. Further, the present disclosure may be applied also to an image recording apparatus which performs recording of an image by performing printing with a white ink as a base on a recording medium made of a transparent resin such as a transparent film, and then by discharging black, yellow, cyan and magenta inks from the head. Furthermore, the present disclosure may be applied also to an image recording apparatus which performs recording of an image with respect to a recording medium by using a liquid which is different from the ink.

Moreover, in the forgoing description, the conveying mechanism which conveys the recording medium is the roller conveying mechanism using the conveying rollers; the present disclosure, however, is not limited to this. For example, the conveying mechanism may be a conveying mechanism in which a recording medium is placed on a belt, and then the belt is made to run, thereby conveying the recording medium; alternatively, the conveying mechanism may be a conveying mechanism in which a recording medium is placed on a table, and then the table is moved by a moving mechanism such as a ball screw, thereby conveying the recording medium.

The invention claimed is:

1. An image recording apparatus comprising:
    a conveyor configured to convey a recording medium in a conveyance direction;
    a carriage configured to move in a scanning direction crossing the conveyance direction;
    a recording head mounted on the carriage and including a nozzle row including a plurality of nozzles aligned in the conveyance direction; and
    a controller configured to record an image on the recording medium by alternately executing a recording pass of causing the recording head to discharge a liquid from the plurality of nozzles toward the recording medium based on image data while causing the carriage to move in the scanning direction, and a conveying operation of causing the conveyor to convey the recording medium in the conveyance direction, wherein in a case that the image is to be recorded and that the controller causes, in the conveying operation, the conveyor to convey the recording medium in the conveyance direction so that recording areas, on the recording medium, in which the image is recorded in two continuous recording passes as the recording pass performed continuously twice, respectively, partially overlap each other, the controller is configured to record thinned-out images, in which different parts of a line image are thinned out based on mask data, by using different nozzles among the plurality of nozzles in each of the two continuous recording passes, so as to record the line image, the line image corresponding to one line in the scanning direction in an overlap area at which the recording areas partially overlap with each other in the two continuous recording passes, wherein in a case that a moving direction in the scanning direction of the carriage in one of the two continuous recording passes is same as a moving direction in the scanning direction of the carriage in the other of the two continuous recording passes, the controller is configured to make a length in the conveyance direction of the overlap area to be a first length, and wherein in a case that the moving direction in the scanning direction of the carriage in the one of the two continuous recording passes is different from the moving direction in the scanning direction of the carriage in the other of the two continuous recording passes, the controller is configured to make the length in the conveyance direction of the overlap area to be a second length which is shorter than the first length.

2. The image recording apparatus according to claim 1, wherein the controller is configured to execute:
a unidirectional recording mode of discharging the liquid from the plurality of nozzles in a case that the image is to be recorded and that the controller causes the carriage to move only toward one side in the scanning direction; and
a bidirectional recording mode of discharging the liquid from the plurality of nozzles in a case that the image is to be recorded and that the controller causes the carriage to move toward either one of the one side and the other side in the scanning direction,
wherein in the unidirectional recording mode, the controller is configured to make the length in the conveyance direction of the overlap area regarding each of the two continuous recording passes to be the first length, and
wherein in the bidirectional recording mode, the controller is configured to make the length in the conveyance direction of the overlap area regarding each of the two continuous recording passes to be the second length.

3. The image recording apparatus according to claim 1, wherein in a case that the image is to be recorded, the controller is configured to determine, based on the image data, regarding each of the two continuous recording passes among all of the recording pass, whether to make the moving direction in the scanning direction of the carriage in a subsequent recording pass of the two continuous recording passes to be same as or different from the moving direction in the scanning direction of the carriage in a preceding recording pass of the two continuous recording passes, wherein the controller is configured to make the length in the conveyance direction of the overlap area, regarding the two continuous recording passes regarding which the controller has determined that the moving direction in the scanning direction of the carriage in the subsequent recording pass is made to be same as that in the preceding recording pass, to be the first length, and wherein the controller is configured to make the length in the conveyance direction of the overlap area, regarding the two continuous recording passes regarding which the controller has determined that the moving direction in the scanning direction of the carriage in the subsequent recording pass is made to be different from that in the preceding recording pass, to be the second length.

4. The image recording apparatus according to claim 1, wherein the controller is configured to change a length of the second length depending on a predetermined condition.

5. The image recording apparatus according to claim 4, wherein the controller is configured to obtain information regarding a deviating amount of landing positions in the scanning direction of the liquid on the recording medium between the two continuous recording passes in the case that the moving direction in the scanning direction of the carriage in the one of the two continuous recording passes is different from that in the other of the two continuous recording passes, and wherein in the case that the moving direction in the scanning direction of the carriage in the one of the two continuous recording passes is different from that in the other of the two continuous recording passes, the controller is configured to make, based on the obtained information, the second length to be shorter as the deviating amount of the landing positions in the scanning direction of the liquid is greater, and to perform the recording of the image regarding the two continuous recording passes.

6. The image recording apparatus according to claim 4, wherein the conveyor includes:
an upstream-side roller pair which is located on an upstream side of the recording head in the conveyance direction, and which is configured to nip the recording medium and to convey the recording medium in the conveyance direction; and
a downstream-side roller pair which is located on a downstream side of the recording head in the conveyance direction, and which is configured to receive the recording medium from the upstream-side roller pair, to nip the recording medium and to convey the recording medium in the conveyance direction,
wherein in the case that the moving direction in the scanning direction of the carriage in the one of the two continuous recording passes is different from that in the other of the two continuous recording passes, and that the recording medium is nipped by one of the upstream-side roller pair and the downstream-side roller pair, the controller is configured to make the second length to be longer as compared with a case that the recording medium is nipped by both of the upstream-side roller pair and the downstream-side roller pair, and to perform the recording of the image regarding the two continuous recording passes.

7. The image recording apparatus according to claim 4, further comprising:
a first medium-supply passage in which the recording medium is subjected to front-rear surface reversal such that a front surface and a rear surface of the recording medium are reversed, and via which the recording medium is supplied to the conveyor; and
a second medium-supply passage in which the recording medium is not subjected to the front-rear surface reversal, and via which the recording medium is supplied to the conveyor,
wherein in the case that the moving direction in the scanning direction of the carriage in the one of the two continuous recording passes is different from that in the other of the two continuous recording passes, and that the recording medium is supplied from the first medium-supply passage to the conveyor, the controller is configured to adjust the second length to be longer as compared with a case that the recording medium is supplied from the second medium-supply passage to the conveyor, and to perform the recording of the image regarding the two continuous recording passes.

8. The image recording apparatus according to claim 7, wherein the first medium-supply passage is a medium-supply passage via which the recording medium, supported by a first tray, is supplied to the conveyor, and
wherein the second medium-supply passage is a medium-supply passage via which the recording medium, supported by a second tray different from the first tray, is supplied to the conveyor.

9. The image recording apparatus according to claim 1, further comprising a memory configured to store, as reference mask data, the mask data in a case that the length in the conveying direction of the overlap area in the two continuous recording passes is a predetermined reference length,
wherein in a case that the thinned-out images are to be recorded, the controller is configured to use, regarding the overlap area having the length in the conveyance direction which is shorter than the reference length, a part, of the reference mask data, in accordance with the length in the conveyance direction of the overlap area as the mask data so as to record the thinned-out images in the overlap area.

10. An image recording apparatus comprising:
a conveyor configured to convey a recording medium in a conveyance direction;
a carriage configured to move in a scanning direction crossing the conveyance direction;
a recording head mounted on the carriage and including a nozzle row including a plurality of nozzles aligned in the conveyance direction; and
a controller configured to record an image on the recording medium by alternately executing a recording pass of causing the recording head to discharge a liquid from the plurality of nozzles toward the recording medium based on image data while causing the carriage to move in the scanning direction, and a conveying operation of causing the conveyor to convey the recording medium in the conveyance direction; and
in a case that the image is to be recorded and that a moving direction in the scanning direction of the carriage in one of two continuous recording passes as the recording pass performed continuously twice is same as a moving direction in the scanning direction of the carriage in the other of the two continuous recording passes,
the controller is configured to cause, in the conveying operation, the conveyor to convey the recording medium in the conveyance direction such that recording areas, on the recording medium, in which the image is recorded by the two continuous recording passes, respectively, partially overlap with each other, and
the controller is configured to record thinned-out images, in which different parts of a line image are thinned out based on mask data, by using different nozzles among the plurality of nozzles in each of the two continuous recording passes, so as to record the line image, the line image corresponding to one line in the scanning direction in an overlap area at which the recording areas partially overlap with each other in the two continuous recording passes, and
in a case that the image is to be recorded and that the moving direction in the scanning direction of the carriage in the one of the two continuous recording passes is different from the moving direction in the scanning direction of the carriage in the other of the two continuous recording passes,
the controller is configured to cause, in the conveying operation, the conveyor to convey the recording medium in the conveyance direction so that the recording areas of the two continuous recording passes, respectively, do not overlap with each other.

* * * * *